US012592175B2

(12) United States Patent
Yuan et al.

(10) Patent No.: US 12,592,175 B2
(45) Date of Patent: Mar. 31, 2026

(54) GATE DRIVER CIRCUIT AND METHOD FOR DRIVING DISPLAY PANEL

(71) Applicant: Novatek Microelectronics Corp., Hsinchu (TW)

(72) Inventors: Kai-Ting Yuan, Hsinchu County (TW); Wei-Lun Shih, Hsinchu City (TW); Chun-Hung Chen, Yunlin County (TW); Li-Yang Tang, New Taipei City (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/888,152

(22) Filed: Sep. 17, 2024

(65) Prior Publication Data

US 2025/0279029 A1 Sep. 4, 2025

Related U.S. Application Data

(60) Provisional application No. 63/559,212, filed on Feb. 29, 2024.

(51) Int. Cl.
*G09G 3/20* (2006.01)

(52) U.S. Cl.
CPC ... *G09G 3/2092* (2013.01); *G09G 2310/0267* (2013.01); *G09G 2310/0289* (2013.01); *G09G 2310/0291* (2013.01)

(58) Field of Classification Search
CPC ......... G09G 3/2092; G09G 2310/0267; G09G 2310/0289; G09G 2310/0291; G09G 3/3266; G09G 3/20; G09G 3/3677
See application file for complete search history.

(56) References Cited

U.S. PATENT DOCUMENTS

| | | | | |
|---|---|---|---|---|
| 9,524,665 | B2 * | 12/2016 | Peng | G09G 3/3677 |
| 10,984,709 | B2 * | 4/2021 | Lo | G09G 3/20 |
| 11,749,159 | B2 | 9/2023 | Byeon et al. | |
| 12,051,371 | B2 * | 7/2024 | Kim | G09G 3/32 |
| 2003/0043132 | A1 * | 3/2003 | Nakamura | G09G 3/3233 345/204 |
| 2006/0209498 | A1 * | 9/2006 | Leo | G09G 3/3677 361/600 |
| 2007/0002509 | A1 * | 1/2007 | Kumagai | G09G 3/3688 361/56 |

(Continued)

FOREIGN PATENT DOCUMENTS

| | | |
|---|---|---|
| CN | 116386513 A | 7/2023 |
| TW | 202307814 A | 2/2023 |

OTHER PUBLICATIONS

"Office Action of Taiwan counterpart Application", issued on Sep. 16, 2025, p. 1-p. 6.

*Primary Examiner* — Jose R Soto Lopez
(74) *Attorney, Agent, or Firm* — JCIPRNET

(57) ABSTRACT

A gate driver circuit configured to drive a display panel is provided. The gate driver circuit includes an output buffer circuit and a controller circuit. The output buffer circuit includes a plurality of current transmission paths. The output buffer circuit is configured to output a driving signal to drive the display panel. The controller circuit is coupled to the output buffer circuit. The controller circuit is configured to control conduction states of the current transmission paths of the output buffer circuit.

25 Claims, 24 Drawing Sheets

(56) References Cited

U.S. PATENT DOCUMENTS

| | | | | |
|---|---|---|---|---|
| 2009/0115524 | A1* | 5/2009 | Liu | H03F 3/45192 330/261 |
| 2011/0187457 | A1* | 8/2011 | Hsu | G09G 3/3688 330/192 |
| 2011/0248971 | A1* | 10/2011 | Huang | G09G 3/3677 345/87 |
| 2015/0229273 | A1* | 8/2015 | Liu | G09G 3/3677 345/98 |
| 2015/0279275 | A1* | 10/2015 | Tanikame | G09G 3/30 345/204 |
| 2018/0197464 | A1* | 7/2018 | Yamamoto | G09G 3/3208 |
| 2019/0114013 | A1* | 4/2019 | Wu | G06F 3/04166 |
| 2023/0043062 | A1* | 2/2023 | Byeon | G09G 3/20 |
| 2023/0169925 | A1* | 6/2023 | Yang | G09G 3/3266 |
| 2023/0215380 | A1 | 7/2023 | Kim et al. | |
| 2023/0237960 | A1* | 7/2023 | Iwane | G09G 3/006 345/55 |
| 2024/0105098 | A1* | 3/2024 | Chen | G09G 3/20 |
| 2024/0144853 | A1* | 5/2024 | Tsuchi | H03K 19/018521 |
| 2024/0221682 | A1* | 7/2024 | Kim | G09G 3/3266 |
| 2024/0282231 | A1* | 8/2024 | Lin | H02J 7/345 |

* cited by examiner

1730

1930

2030

2030

GATE DRIVER CIRCUIT AND METHOD FOR DRIVING DISPLAY PANEL

CROSS-REFERENCE TO RELATED APPLICATION

This application claims the priority benefit of U.S. Provisional application Ser. No. 63/559,212, filed on Feb. 29, 2024. The entirety of the above-mentioned patent application is hereby incorporated by reference herein and made a part of this specification.

BACKGROUND

Technical Field

The invention relates to a driver circuit and a driving method, more specifically, to agate driver circuit and a method for driving a display panel.

Description of Related Art

In related fields, gate on array (GOA) circuits on a display panel are designed to output scan signals to respective pixel rows. The rising and falling times of the scan signals are determined based on the driving capabilities of the gate driver circuits and the GOA circuits and the panel impedance. Due to the increasing demand for larger panel sizes and higher refresh rates, data is written to pixels in shorter periods of time, making it more sensitive to the rising and falling times of the scan signals. Insufficient time to write data into pixels can affect display quality.

How to increase the time for writing data to the pixels is an important issue in the related fields.

SUMMARY

The invention is directed to a gate driver circuit and a method for driving a display panel, capable of increasing the time for writing data to the pixels by enhancing the driving capability of the gate driver circuit.

An embodiment of the invention provides a gate driver circuit configured to drive a display panel. The gate driver circuit includes an output buffer circuit and a controller circuit. The output buffer circuit includes a plurality of current transmission paths. The output buffer circuit is configured to output a driving signal to drive the display panel. The controller circuit is coupled to the output buffer circuit. The controller circuit is configured to control conduction states of the current transmission paths of the output buffer circuit.

An embodiment of the invention provides a method for driving a display panel adapted to a display device. The display device includes a gate driver circuit and the display panel, and the gate driver circuit includes an output buffer circuit. The method includes: controlling conduction states of current transmission paths of the output buffer circuit; and outputting a driving signal from the output buffer circuit to drive the display panel. The driving capability of the output buffer circuit is determined according to a number of the current transmission paths that are conducted. At least two of the current transmission paths are conducted at the same time in a specified phase.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 1:
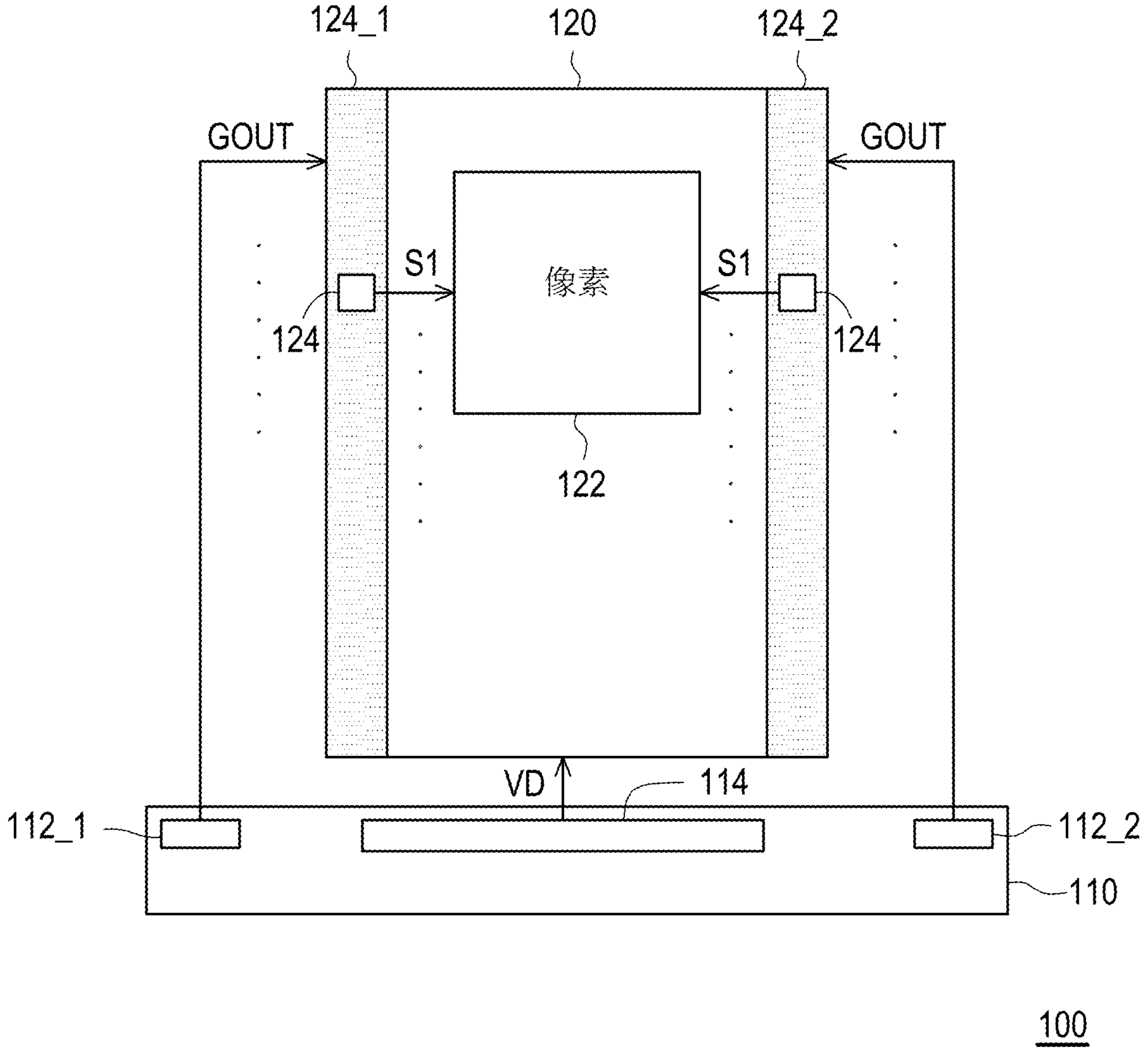
FIG. 1 is a schematic diagram illustrating a display device according to an embodiment of the invention.
Figure 2:
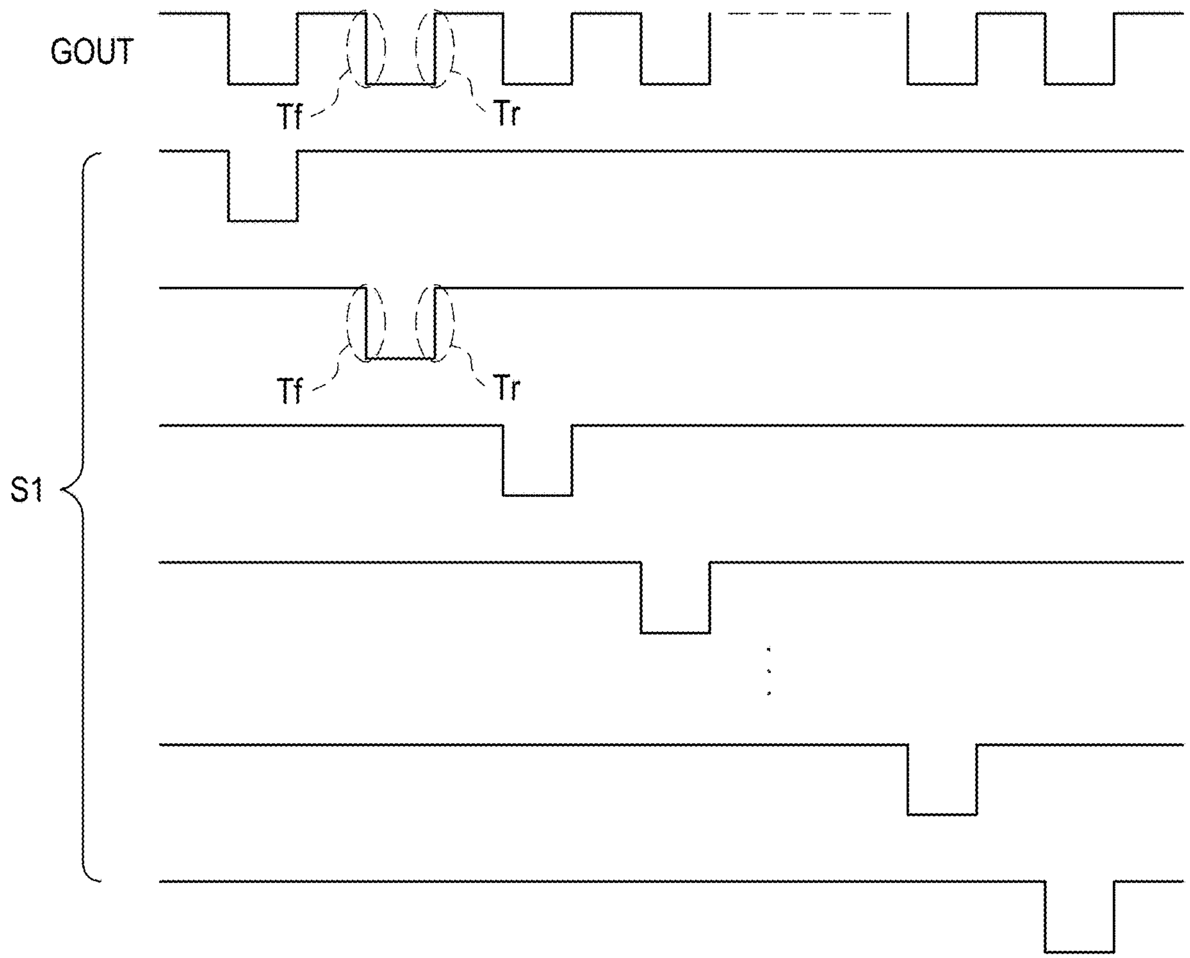
FIG. 2 is a waveform diagram illustrating driving signals and scan signals of FIG. 1 according to an embodiment of the invention.

FIG. 1 is a schematic diagram illustrating a display device according to an embodiment of the invention. FIG. 2 is a waveform diagram illustrating driving signals and scan signals of FIG. 1 according to an embodiment of the invention. Referring to FIG. 1 and FIG. 2, the display device 100 includes a driver circuit 110 and a display panel 120. The display panel 120 includes a plurality of display pixels 122. For clarity, only one display pixel 122 is shown in FIG. 2, but the invention is not limited thereto. The driver circuit 110 is configurable to be coupled to the display panel 120. The driver circuit 110 is configured to drive the display panel 120 to perform a display operation.

The driver circuit 110 includes gate driver circuits 112_1 and 112_2 and a source driver circuit 114. The display panel 120 further includes a plurality of GOA circuits 124. The GOA circuits 124 are disposed in gate on array (GOA) circuit blocks 124_1 and 124_2. The GOA circuit blocks 124_1 and 124_2 respectively include the plurality of GOA circuits 124, e.g. shift registers. The GOA circuit 124 of a stage is corresponding to a pixel row. The driver circuit 110 is configured to output driving signals GOUT to the GOA circuit blocks 124_1 and 124_2. The GOA circuits 124 are configured to generate scan signals S1 to respective pixel rows according to the driving signal GOUT as illustrated in FIG. 2. The scan signals S1 are outputted to the respective pixel rows in sequence. The numbers of the gate driver circuits 112_1 and 112_2, the GOA circuit blocks 124_1 and 1242, and the source driver circuit 114 do not intend to limit the invention. Implementation for the structures of the gate driver circuits 112_1 and 112_2, the GOA circuits 124, and the source driver circuit 114 can be obtained, taught and suggested with reference to common knowledge in the related art.

Figure 3:
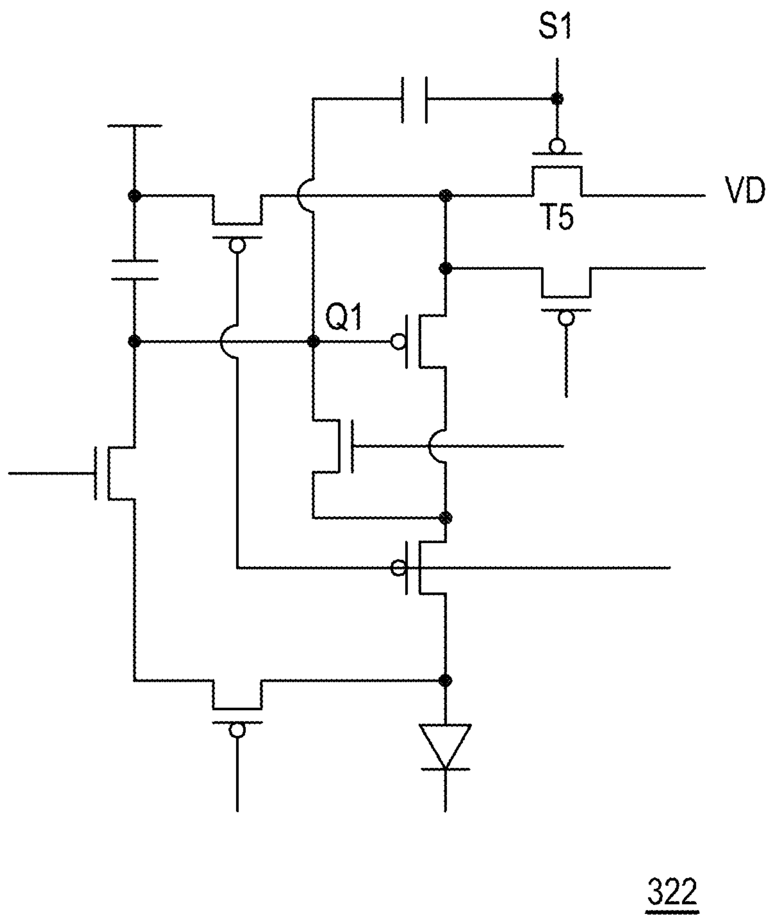
FIG. 3 is a circuit diagram illustrating the display pixel of FIG. 1 according to an embodiment of the invention.
Figure 4A:
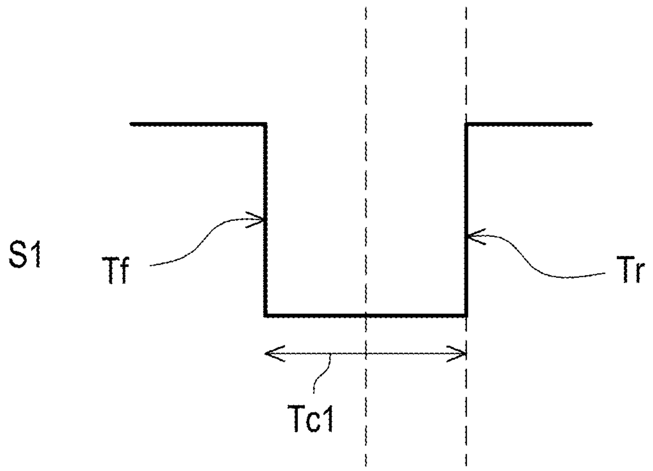
FIG. 4A is a waveform diagram illustrating the scan signal of FIG. 1 according to an embodiment of the invention.
Figure 4B:
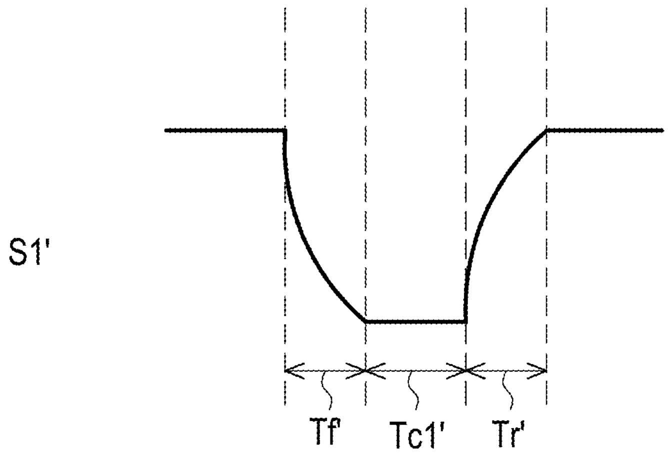
FIG. 4B (RELATED ART)
FIG. 4B is a waveform diagram illustrating a scan signal according to a related art.

The gate driver circuit disclosed in the embodiments of the invention can be at least applied to display devices having LCD panels or OLED panels, but the invention is not limited thereto. To be specific, FIG. 3 is a circuit diagram illustrating the display pixel of FIG. 1 according to an embodiment of the invention. FIG. 4A is a waveform diagram illustrating the scan signal of FIG. 1 according to an embodiment of the invention. FIG. 4B is a waveform diagram illustrating a scan signal according to a related art.

Referring to FIG. 1 to FIG. 4B, the display panel 120 may be a low-temperature polycrystalline oxide (LTPO) organic light emitting diode (OLED) display panel, but the invention is not limited thereto. The circuit structure of the display pixel 322 is shown in FIG. 3, but the circuit structure does not intend to limit the invention.

The scan signal S1 is configured to control the conduction state of the transistor T5. When the transistor T5 is conducted, a data signal VD from the source driver circuit 114 can be written into a node Q1 of the display pixel 322. In FIG. 4B, Tc1' is the time that the data signal VD can be the written into the node Q1. If the time Tc1' is too short, the data signal VD may not have a sufficient time to be written into the node Q1, which can affect the display quality.

In FIG. 4A of the present embodiment, by enhancing the driving capability of the gate driver circuits, the scan signal S1 having a long time Tc1 is provided to drive the display pixel 322. This ensures that the data signal VD has the sufficient time Tc1 to be written into the node Q1.

Figure 5:
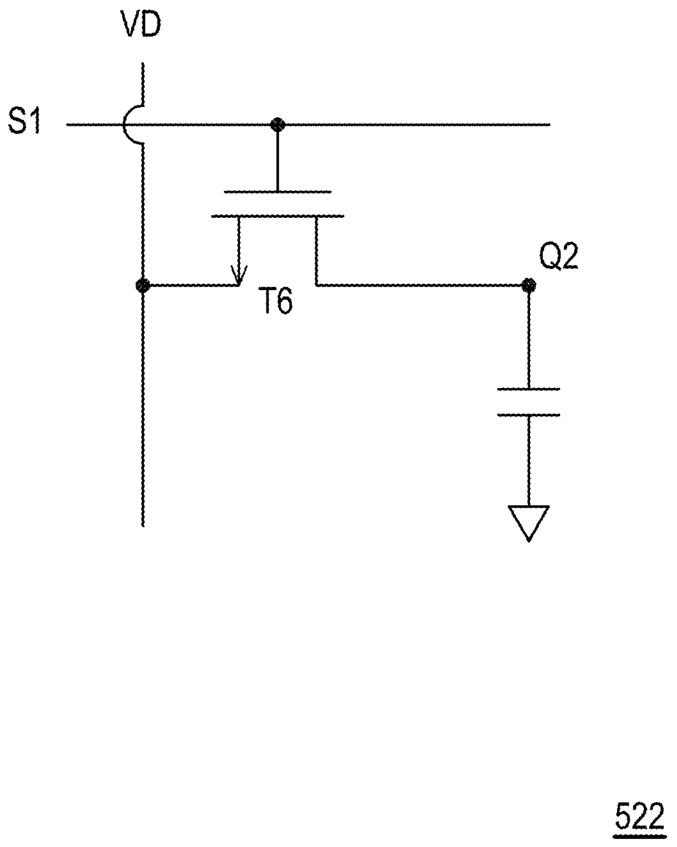
FIG. 5 is a circuit diagram illustrating the display pixel of FIG. 1 according to another embodiment of the invention.
Figure 6A:
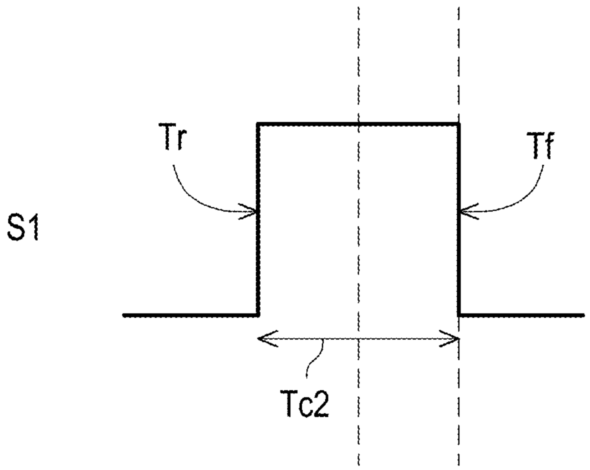
FIG. 6A is a waveform diagram illustrating the scan signal of FIG. 1 according to another embodiment of the invention.
Figure 6B:
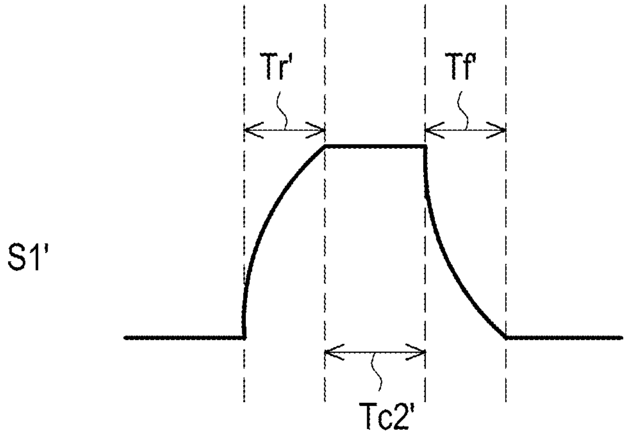
FIG. 6B (RELATED ART)
FIG. 6B is a waveform diagram illustrating a scan signal according to a related art.

FIG. 5 is a circuit diagram illustrating the display pixel of FIG. 1 according to another embodiment of the invention. FIG. 6A is a waveform diagram illustrating the scan signal of FIG. 1 according to another embodiment of the invention. FIG. 6B is a waveform diagram illustrating a scan signal according to a related art. Referring to FIG. 1 and FIG. 5 to FIG. 6B, the display panel 120 may be an amorphous silicon (a-Si) liquid crystal display (LCD) panel, but the invention is not limited thereto. The circuit structure of the display pixel 522 is shown in FIG. 5, but the circuit structure does not intend to limit the invention.

The transistor T6 is conducted to allow the data signal VD to be written into the node Q2. Similarly, in a related art of FIG. 6B, the time Tc2' of the scan signal S1' may be too short, such that the data signal VD may not have a sufficient time to be written into the node Q2, which can affect the display quality. In the present embodiment of FIG. 6A, by enhancing the driving capability of the gate driver circuits, the scan signal S1 having a long time Tc2 is provided to drive the display pixel 522. This ensures that the data signal VD has the sufficient time Tc2 to be written into the node Q2.

Therefore, the gate driver circuits disclosed in the embodiments of the invention can be at least applied to display devices having LCD panels or OLED panels, but the invention is not limited thereto.

Figure 7:
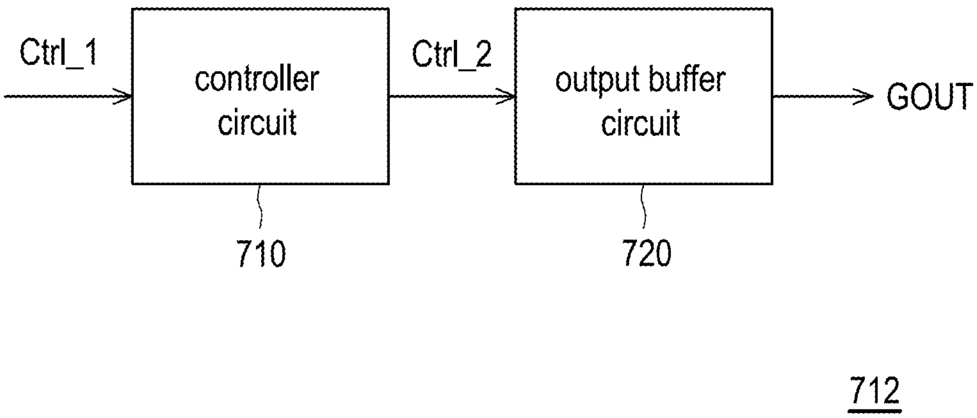
FIG. 7 is a block diagram illustrating a gate driver circuit according to an embodiment of the invention.

FIG. 7 is a block diagram illustrating a gate driver circuit according to an embodiment of the invention. Referring to FIG. 7, the gate driver circuit 712 includes a controller circuit 710 and an output buffer circuit 720. The output buffer circuit 720 includes a plurality of current transmission paths, and configured to output the driving signal GOUT to drive the display panel 120. The controller circuit 710 is coupled to the output buffer circuit 720. The controller circuit 710 receives at least one first control signal Ctrl_1 and outputs at least one second control signal Ctrl_2 according to the at least one first control signal Ctrl_1. The controller circuit 710 is configured to control conduction states of current transmission paths of the output buffer circuit 720 by the at least one second control signal Ctrl_2, to enhancing the driving capability of the output buffer circuit 720. For example, by conducting a plurality of current transmission paths of the output buffer circuit 720, the gate driver circuit 712 can generate the driving signal GOUT having a short rising time Tr and a short falling time Tf, as shown in FIG. 2. Accordingly, the GOA circuit 124 can also generate the corresponding scan signal S1 having the short rising time Tr and the short falling time Tf.

Figure 8:
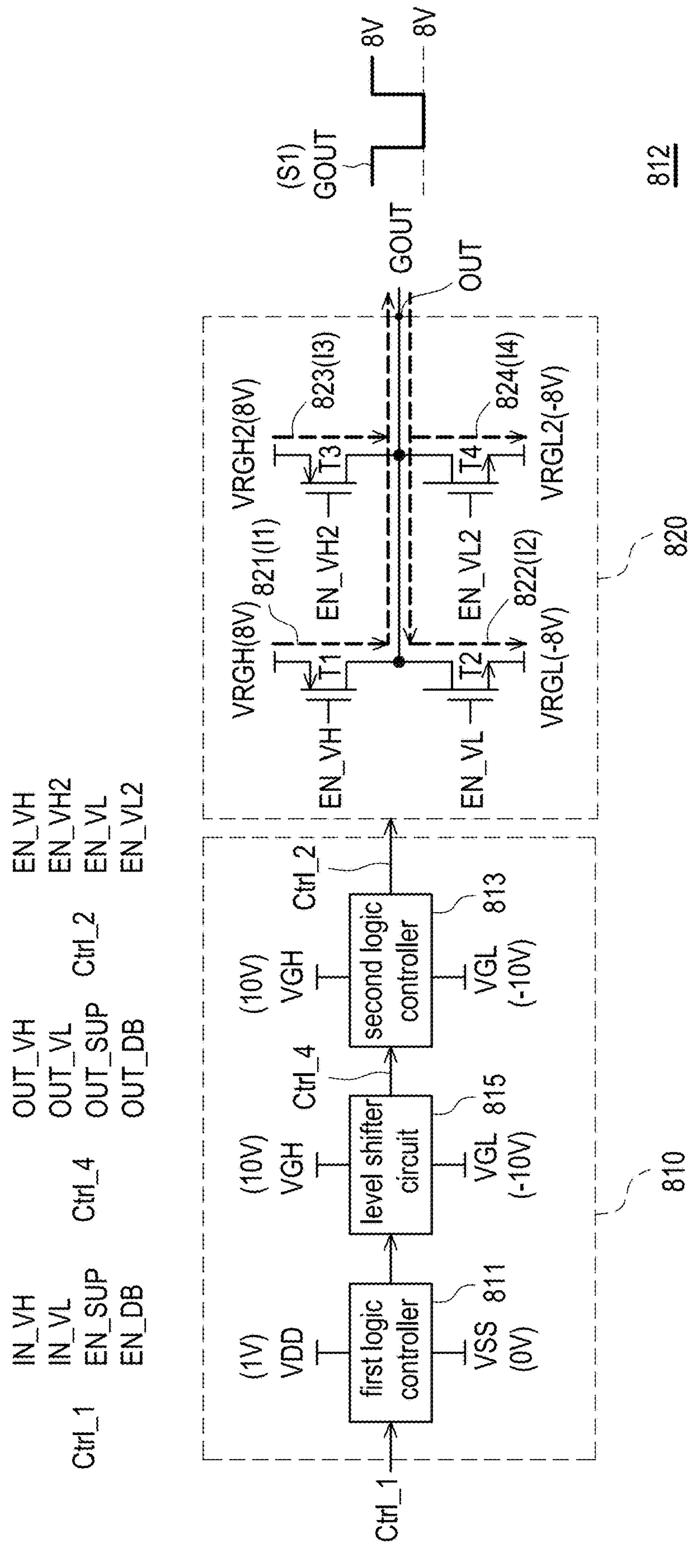
FIG. 8 is a schematic diagram illustrating a gate driver circuit according to another embodiment of the invention.
Figure 9A:
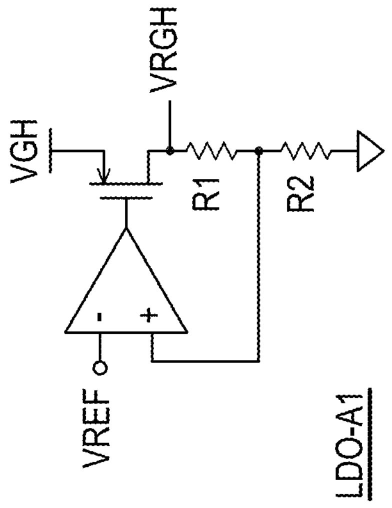
FIG. 9A, FIG. 9B, FIG. 9C and FIG. 9D respectively illustrate LDO class A architectures according to an embodiment of the invention.
Figure 9B:
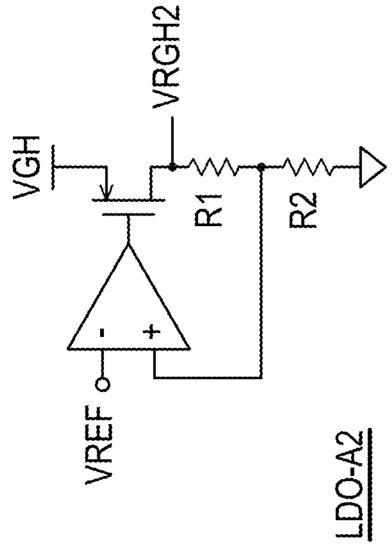
Figure 9C:
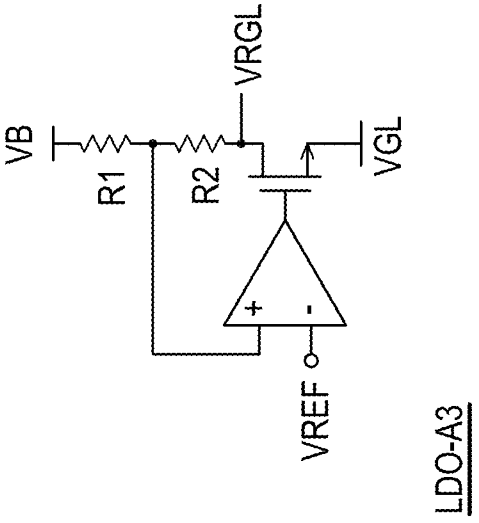
Figure 9D:
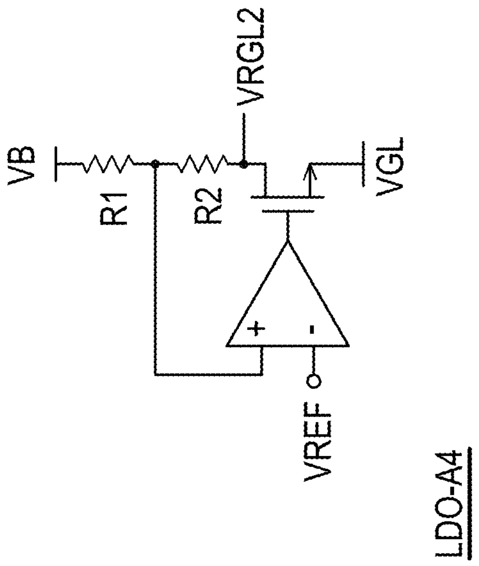
Figure 10A:
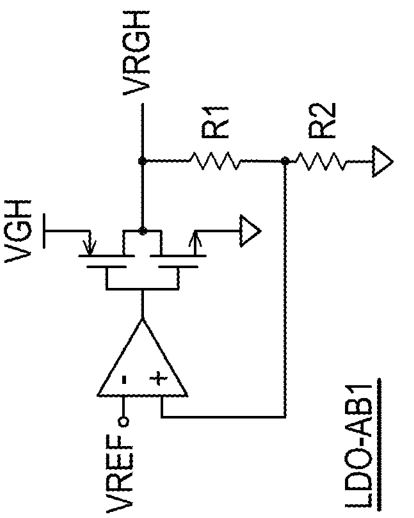
FIG. 10A, FIG. 10B, FIG. 10C and FIG. 10D respectively illustrate LDO class AB architectures according to an embodiment of the invention.
Figure 10B:
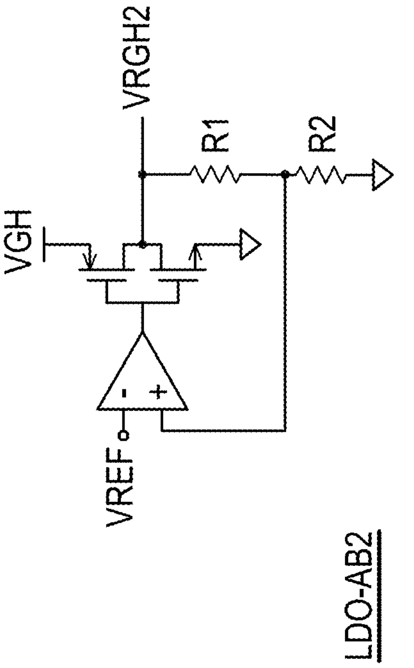
Figure 10C:
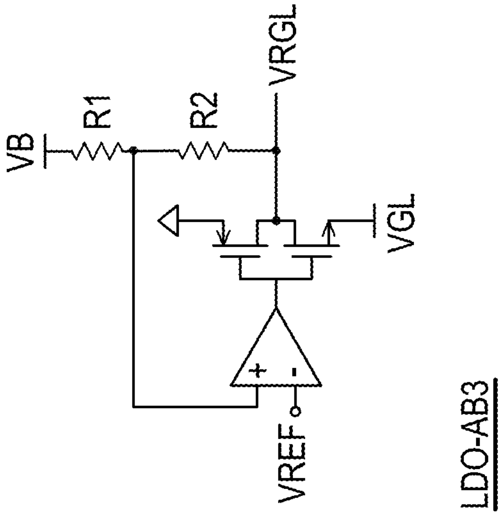
Figure 10D:
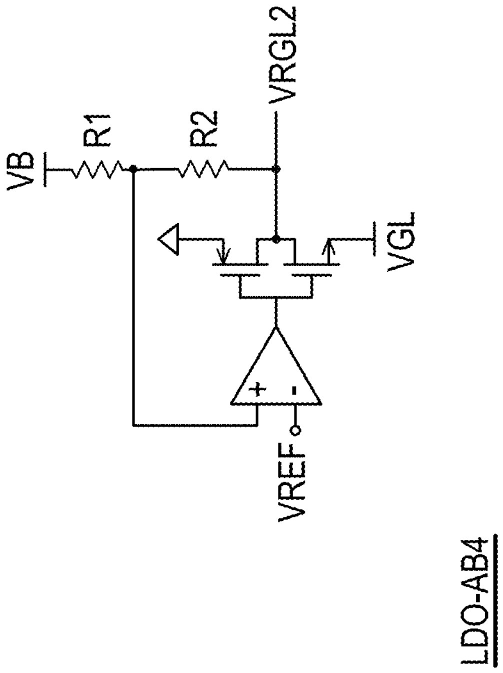

FIG. 8 is a schematic diagram illustrating a gate driver circuit according to another embodiment of the invention. Referring to FIG. 8, the gate driver circuit 812 includes a controller circuit 810 and an output buffer circuit 820. The controller circuit 810 is coupled to the output buffer circuit 820. The controller circuit 810 includes a first logic controller 811, a second logic controller 813, and a level shifter circuit 815. The first logic controller 811 operates between operating voltages VDD and VSS, e.g. 1 voltage (V) and 0V, wherein the operating voltage VDD is larger than the operating voltage VSS. The second logic controller 813 and the level shifter circuit 815 operate between operating voltages VGH and VGL, e.g. 9 V and −9V or 10V and −10V, wherein the operating voltage VGH is larger than the operating voltages VGL and VDD, and the operating voltage VSS is larger than the operating voltages VGL. The above-mentioned voltage values do not intend to limit the invention.

The first logic controller 811 receives the first control signal Ctrl_1 from a digital circuit, e.g. an automatic placement and routing (APR) chip, inside the driver circuit 110 and outputs the first control signal Ctrl_1 to the level shifter circuit 815, wherein the first control signal Ctrl_1 includes signals IN_VH, IN_VL, EN_SUP and EN_DB. When the signals IN_VH and IN_VL are bits 1, current transmission paths 821 and 822 or current transmission paths 823 and 824 of the output buffer circuit 820 are turned on at the same time to cause a short current. The first logic controller 811 can control the current transmission paths 821 and 822 or the current transmission paths 823 and 824 are not turned on at the same time to avoid the short current. The signal EN_SUP is configured to indicate the selection of operating voltages VRGH, VRGH2, VRGL, and VRGL2. The signal EN_DB is configured to indicate whether to enhance the driving capability of the output buffer circuit 820. The first logic controller 811 may output the signals IN_VH, IN_VL, EN_SUP and EN_DB to the level shifter circuit 815. Implementation for the circuit structures of the first logic controller 811 can be obtained, taught and suggested with reference to common knowledge in the related art.

The level shifter circuit 815 is coupled to the first logic controller 811. The level shifter circuit 815 receives the signals IN_VH, IN_VL, EN_SUP and EN_DB of low level from the first logic controller 811. The level shifter circuit 815 shifts the signals IN_VH, IN_VL, EN_SUP and EN_DB of low level to signals OUT_VH, OUT_VL, OUT_SUP and OUT_DB of high level, wherein a fourth control signal Ctrl_4 includes the signals OUT_VH, OUT_VL, OUT_SUP and OUT_DB. The level shifter circuit 815 outputs the fourth control signal Ctrl_4 to the second logic controller 813.

The second logic controller 813 is coupled to the level shifter circuit 815. The second logic controller 813 receives the fourth control signal Ctrl_4 from the level shifter circuit 815, and outputs the second control signal Ctrl_2, wherein the second control signal Ctrl_2 includes signals EN_VH, EN_VH2, EN_VL and EN_VL2. The second logic controller 813 is configured to output the second control signal Ctrl_2 to control the conduction states of current transmission paths 821, 822, 823, and 824 of the output buffer circuit 820 according to the fourth control signal Ctrl_4, to enhancing the driving capability of the output buffer circuit 820.

The output buffer circuit 820 includes a first transistor T1, a second transistor T2, a third transistor T3 and a fourth transistor T4. The first transistor T1 and the second transistor T2 are coupled between the operating voltages VRGH and VRGL in series. The third transistor T3 and the fourth transistor T4 are coupled between the operating voltages VRGH2 and VRGL2 in series.

To be specific, the first transistor T1 includes a first end, a second end and a control end. The first end of the first transistor T1 is coupled to the operating voltage VRGH. The second end of the first transistor T1 is coupled to the second transistor T2 and an output end OUT of the output buffer circuit 820. The control end of the first transistor T1 is coupled to the signal EN_VH. The signal EN_VH is configured to control the conduction state of the first transistor T1. When the first transistor T1 is turned on, the current transmission path 821 is conducted. The first transistor T1 serves as a current source, and the current I1 is provided to the output end OUT through the current transmission path 821.

The second transistor T2 includes a first end, a second end and a control end. The first end of the second transistor T2 is coupled to the second end of the first transistor T1 and the output end OUT of the output buffer circuit 820. The second end of the second transistor T2 is coupled to the operating voltage VRGL. The control end of the second transistor T2 is coupled to the signal EN_VL. The signal EN_VL is configured to control the conduction state of the second transistor T2. When the second transistor T2 is turned on, the current transmission path 822 is conducted. The second transistor T2 serves as a current sink, and the current I2 is extracted from the output end OUT through the current transmission path 822.

The third transistor T3 includes a first end, a second end and a control end. The first end of the third transistor T3 is coupled to the operating voltage VRGH2. The second end of the third transistor T3 is coupled to the fourth transistor T4 and the output end OUT of the output buffer circuit 820. The control end of the third transistor T3 is coupled to the signal EN_VH2. The signal EN_VH2 is configured to control the conduction state of the third transistor T3. When the third transistor T3 is turned on, the current transmission path 823 is conducted. The third transistor T3 serves as another current source, and the current I3 is provided to the output end OUT through the current transmission path 823.

The fourth transistor T4 includes a first end, a second end and a control end. The first end of the fourth transistor T4 is coupled to the second end of the third transistor T3 and the output end OUT of the output buffer circuit 820. The second end of the fourth transistor T4 is coupled to the operating voltage VRGL2. The control end of the fourth transistor T4 is coupled to the signal EN_VL2. The signal EN_VL2 is configured to control the conduction state of the fourth transistor T4. When the fourth transistor T4 is turned on, the current transmission path 824 is conducted. The fourth transistor T4 serves as another current sink, and the current I4 is extracted from the output end OUT through the current transmission path 824.

In the present embodiment, the driving capability of the output buffer circuit is determined according to a number of the current transmission paths that are conducted. When the first transistor T1 and the third transistor T3 are turned on at the same time, a summation current I1+I3 is provided to the output end OUT through the current transmission paths 821 and 823 to increase the rising speed of the driving signal GOUT, such that the rising time Tr is shorten. On the other hand, when the second transistor T2 and the fourth transistor T4 are turned on at the same time, a summation current I2+I4 is extracted from the output end OUT through the current transmission paths 822 and 824 to increase the falling speed of the driving signal GOUT, such that the falling time Tf is shorten. Therefore, the driving capability of the output buffer circuit 820 can be enhanced to enhance the driving capability of the gate driver circuit 812. The driving capability of the output buffer circuit may indicate the number of the current transmission paths turned on at the same time.

Taking VRGH=VRGH2=8V and VRGL=VRGL2=−8V for example, when the driving capability of the output buffer circuit 820 is enhanced, the driving signal GOUT having a high level 8V and a low level −8V can be generated. As a result, the corresponding scan signal S1 is generated according to the driving signal GOUT, and the scan signal S1 has a sufficient time Tc1 to allow the data signal VD to be written into the node Q1.

In the present embodiment, the operating voltages VRGH, VRGH2, VRGL, and VRGL2 can be provided by low-dropout regulators (LDO) of class A or class AB.

FIG. 9A, FIG. 9B, FIG. 9C and FIG. 9D respectively illustrate LDO class A architectures according to an embodiment of the invention. Referring to FIG. 9A to FIG. 9D, low-dropout regulators LDO_A1, LDO_A2, LDO_A3 and LDO_A4 respectively provide the operating voltages VRGH, VRGH2, VRGL, and VRGL2 to the first transistor T1, the third transistor T3, the second transistor T2 and the fourth transistor T4.

The operating voltages VRGH and VRGH2 can be expressed by the formula (1):

$$VRGH = VRGH2 = \left(\frac{R1 + R2}{R2}\right) \times VREF \quad (1)$$

The operating voltages VRGL and VRGL2 can be expressed by the formula (2):

$$VRGL = VRGL2 = VB - \left(\frac{R1 + R2}{R1}\right) \times (VB - VREF) \quad (2)$$

where R1 and R2 are resistance values, VREF is a reference voltage, and VB is a bias voltage.

FIG. 10A, FIG. 10B, FIG. 10C and FIG. 10D respectively illustrate LDO class AB architectures according to an embodiment of the invention. Referring to FIG. 10A to FIG. 10D, low-dropout regulators LDO_AB1, LDO_AB2, LDO_AB3 and LDO_AB4 respectively provide the operating voltages VRGH, VRGH2, VRGL, and VRGL2 to the first transistor T1, the third transistor T3, the second transistor T2 and the fourth transistor T4. The operating voltages VRGH and VRGH2 can be also expressed by the formula (1), and the operating voltages VRGL and VRGL2 can be also expressed by the formula (2).

FIG. 11A, FIG. 11B, FIG. 11C and FIG. 11D illustrate an output buffer circuit and a driving signal according to an embodiment of the invention. Referring to FIG. 11A to FIG. 11D, the driving signal GOUT is generated in four phases, respectively shown in FIG. 11A to FIG. 11D. Taking VRGH=8V (a first operating voltage), VRGH2=7V, VRGL=−8V, and VRGL2=−9V (a second operating voltage) for example, the driving capability of the output buffer circuit 1120 can be enhanced, and thus the driving signal GOUT having a high level 8V and a low level −9V is generated. That is to say, the driving signal GOUT has the high level equal to the first operating voltage and the low level equal to the second operating voltage. The corresponding scan signal S1 can be generated according to the driving signal GOUT.

Figure 11A:
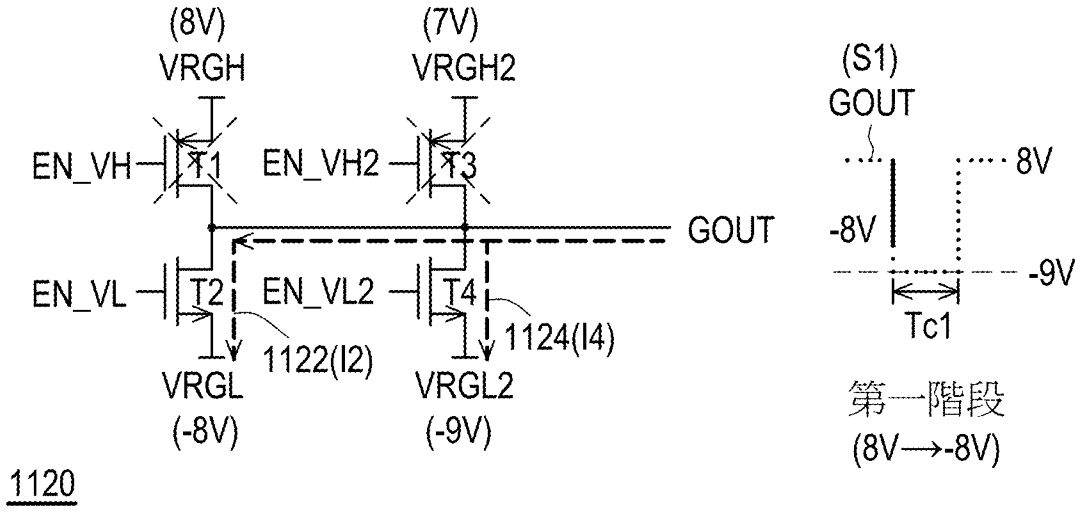
FIG. 11A, FIG. 11B, FIG. 11C and FIG. 11D illustrate an output buffer circuit and a driving signal according to an embodiment of the invention.

FIG. 11A shows the driving signal GOUT changes from 8V to −8V in the first phase. In the first phase, the second transistor T2 and the fourth transistor T4 are turned on at the same time, the summation current I2+I4 is extracted through the conducted current transmission paths 1122 and 1124 to increase the falling speed of the driving signal GOUT, such that the driving signal GOUT can quickly change from 8V to −8V. The conducted current transmission paths 1122 and 1124 are partially overlapped, and coupled to different operating voltages VRGL and VRGL2. That is to say, at least two of the current transmission paths 1121 to 1124 are conducted at the same time in a specified phase, e.g. the first phase, to enhance the driving capability of the output buffer circuit 1120.

Figure 11B:
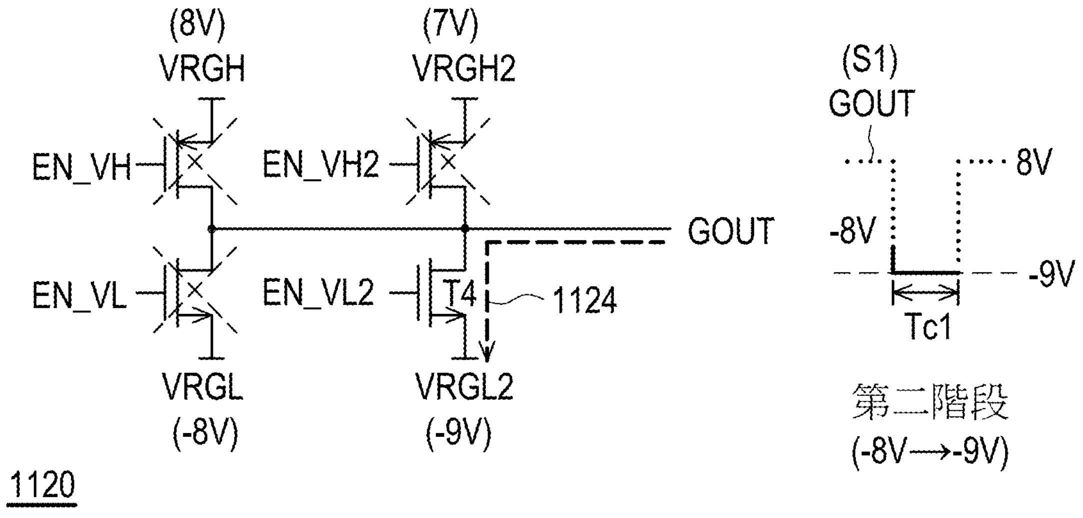

FIG. 11B shows the driving signal GOUT changes from −8V to −9V and is maintained at −9V for the time Tc1 in the second phase. In the second phase, only the fourth transistor T4 are turned on, the current I4 is extracted through the current transmission path 1124, such that the driving signal GOUT can quickly change from −8V to −9V and be maintained at −9V for the time Tc1.

Figure 11C:
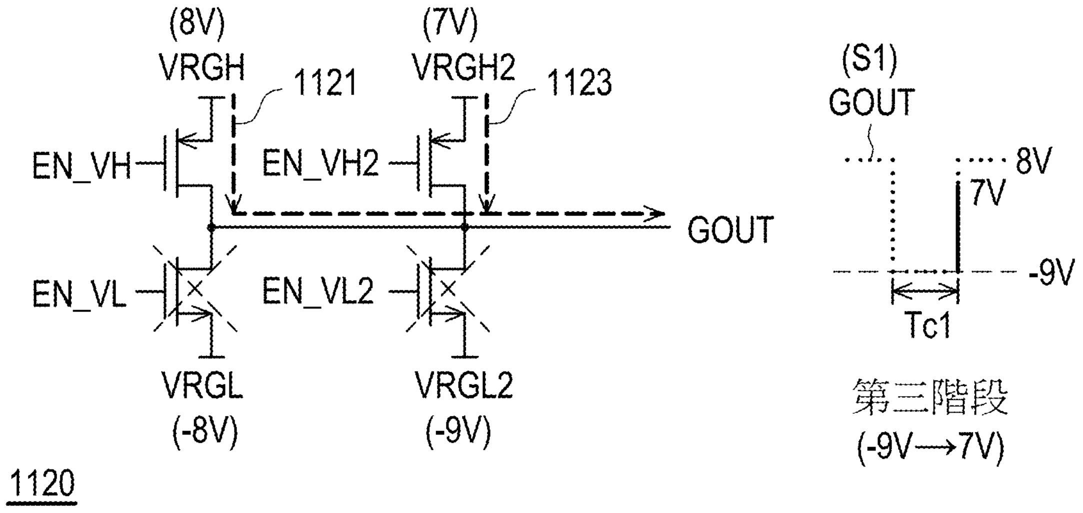

FIG. 11C shows the driving signal GOUT changes from −9V to 7V in the third phase. In the third phase, the first transistor T1 and the third transistor T3 are turned on at the same time, the summation current I1+I3 is provided through the current transmission paths 1121 and 1123 to increase the rising speed of the driving signal GOUT, such that the driving signal GOUT can quickly change from −9V to 7V. The conducted current transmission paths 1121 and 1123 are partially overlapped, and coupled to different operating voltages VRGH and VRGH2. That is to say, at least two of the current transmission paths 1121 to 1124 are conducted at the same time in a specified phase, e.g. the third phase, to enhance the driving capability of the output buffer circuit 1120.

Figure 11D:
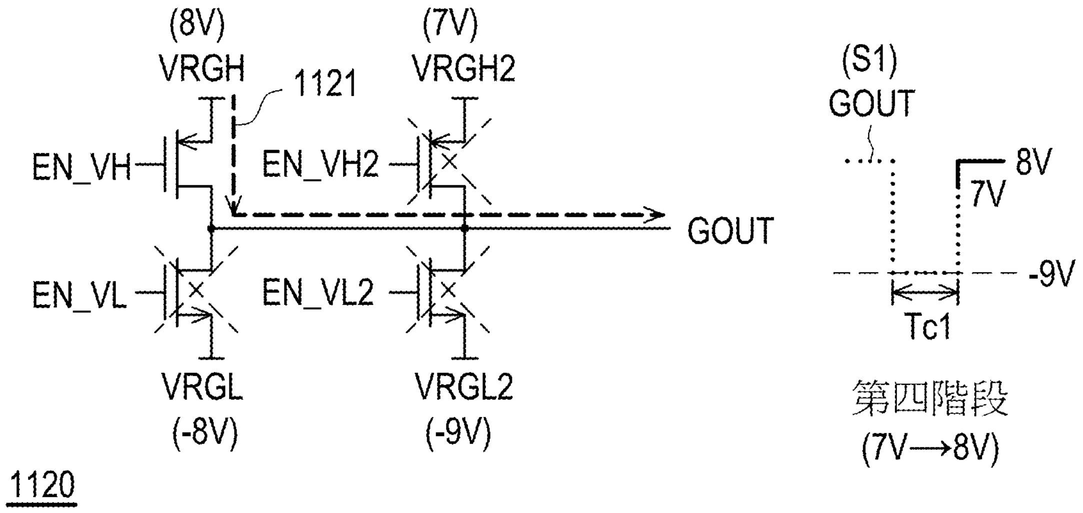

FIG. 11D shows the driving signal GOUT changes from 7V to 8V and is maintained at 8V in the fourth phase. In the fourth phase, only the first transistor T1 are turned on, the current I1 is provided through the current transmission path 1121, such that the driving signal GOUT can quickly change from 7V to 8V and be maintained at 8V.

As can be seen from FIG. 11A to FIG. 11D, the driving capability of the output buffer circuit 1120 is enhanced in the first phase and the third phase, and thus the driving signal GOUT can quickly change from 8V to −9V and return from −9V to 8V.

Figure 12A:
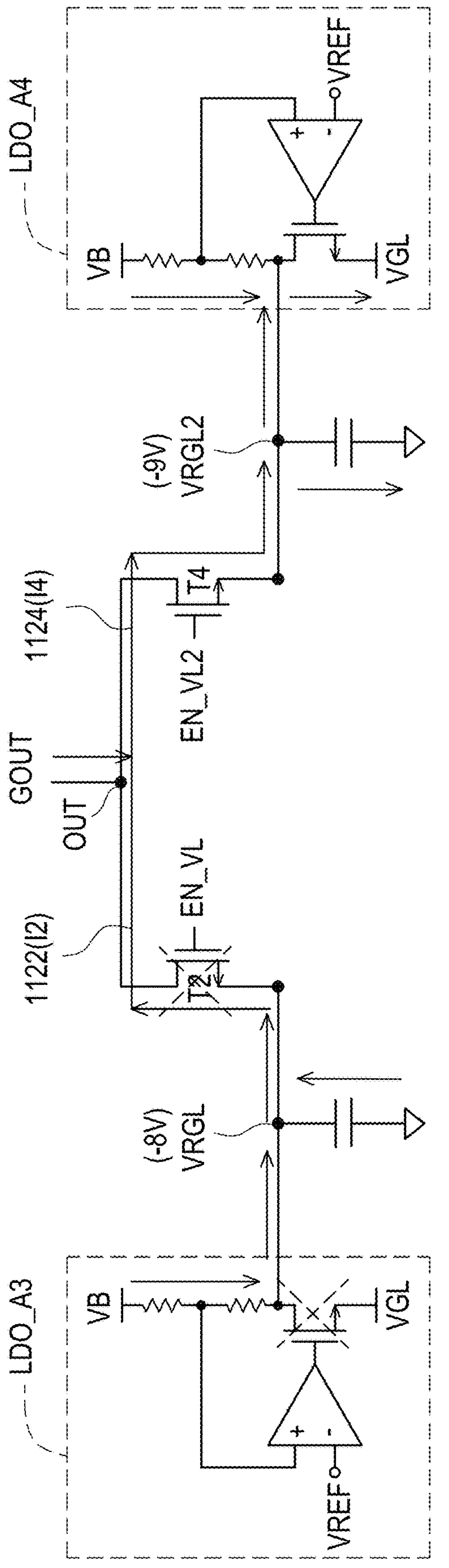
FIG. 12A illustrates the output buffer circuit of FIG. 11B operating in the second phase.

FIG. 12A illustrates the output buffer circuit of FIG. 11B operating in the second phase, wherein the low-dropout regulators LDO_A3 and LDO_A4 respectively provide the operating voltages VRGL and VRGL2 to the second transistor T2 and the fourth transistor T4, and are further illustrated. Referring to FIG. 12A, if the current I2 flows to the output end OUT in the second phase, the falling speed of the driving signal GOUT would be decreased. To avoid the current I2 flowing to the output end OUT in the second phase, the signal EN_VL would turn off the second transistor T2.

Figure 12B:
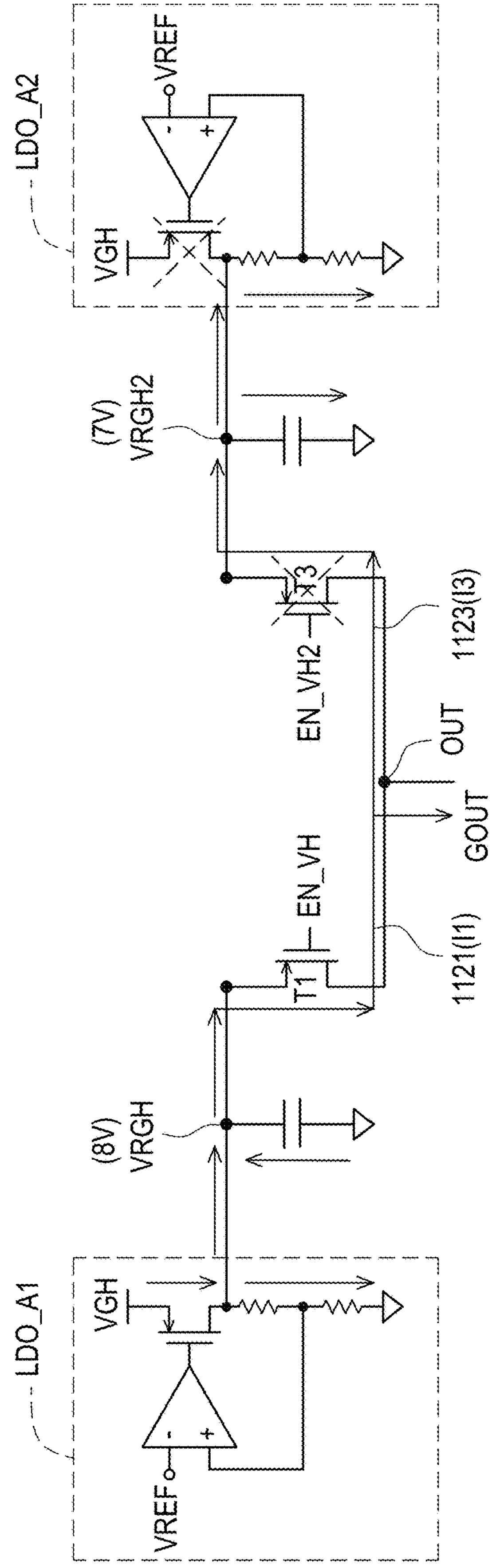
FIG. 12B illustrates the output buffer circuit of FIG. 11D operating in the fourth phase.

FIG. 12B illustrates the output buffer circuit of FIG. 11D operating in the fourth phase, wherein the low-dropout regulators LDO_A1 and LDO_A2 respectively provide the operating voltages VRGH and VRGH2 to the first transistor T1 and the third transistor T3, and are further illustrated. Referring to FIG. 12B, if the current I3 flows to the third transistor T3 in the fourth phase, the rising speed of the driving signal GOUT would be decreased. To avoid the current I3 flowing to the third transistor T3 in the fourth phase, the signal EN_VH2 would turn off the third transistor T3.

Figure 13:
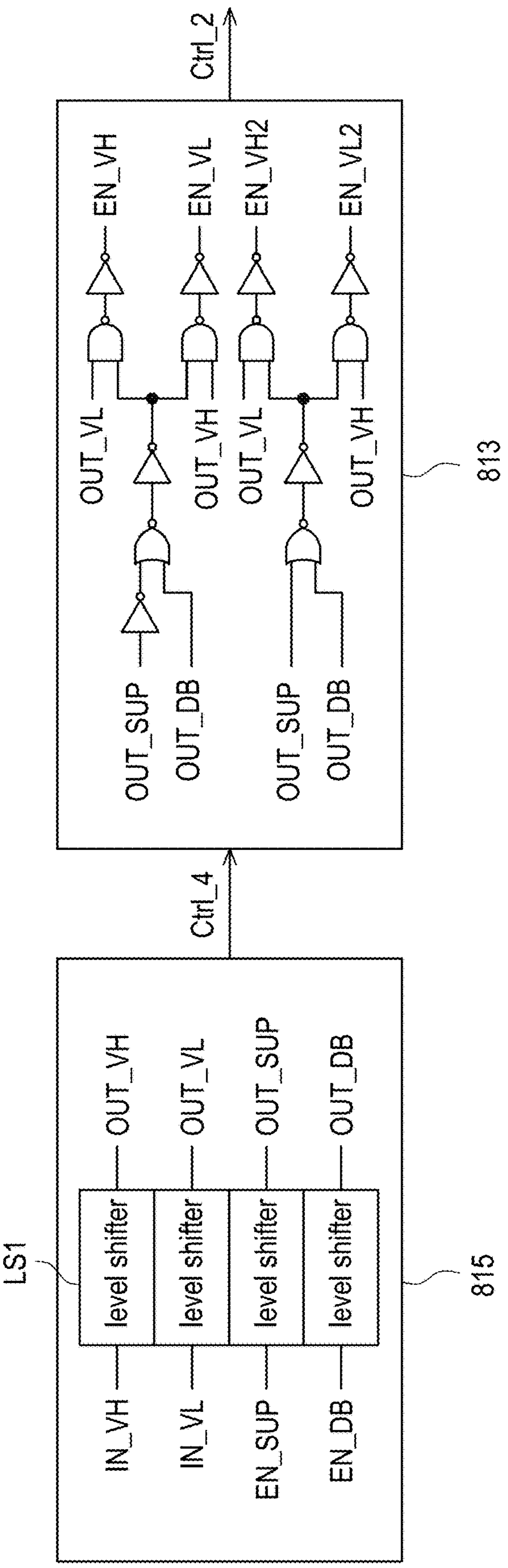
FIG. 13 illustrates circuit structures of the second logic controller and the level shifter circuit of FIG. 8 according to an embodiment of the invention.

FIG. 13 illustrates circuit structures of the second logic controller and the level shifter circuit of FIG. 8 according to an embodiment of the invention. Referring to FIG. 13, the second logic controller 813 and the level shifter circuit 815 operate between the operating voltages VGH and VGL, e.g. 10V and −10V. The level shifter circuit 815 includes a plurality of level shifters LS1 respectively configured to shift the signals IN_VH, IN_VL, EN_SUP and EN_DB of low level to signals OUT_VH, OUT_VL, OUT_SUP and OUT_DB of high level. The second logic controller 813 is implemented by a plurality of logic gates as illustrated in FIG. 13. The second logic controller 813 may work according to the following Table 1:

TABLE 1

| | EN_SUP | EN_DB | IN_VH | IN_VL | EN_VH | EN_VL | EN_VH2 | EN_VL2 |
|---|---|---|---|---|---|---|---|---|
| First phase | 0 | 1 | 0 | 1 | 10 V | 10 V | 10 V | 10 V |
| Second phase | 0 | 1 | 0 | 1 | 10 V | −10 V | 10 V | 10 V |
| Third phase | 0 | 1 | 1 | 0 | −10 V | −10 V | −10 V | −10 V |
| Fourth phase | 0 | 1 | 1 | 0 | −10 V | −10 V | 10 V | −10 V |

The second logic controller 813 outputs the signals EN_VH, EN_VH2, EN_VL and EN_VL2 to control the conduction states of the current transmission paths 821, 822, 823, and 824 of the output buffer circuit 820 according to the fourth control signal Ctrl_4, to enhancing the driving capability of the output buffer circuit 820.

Figure 14:
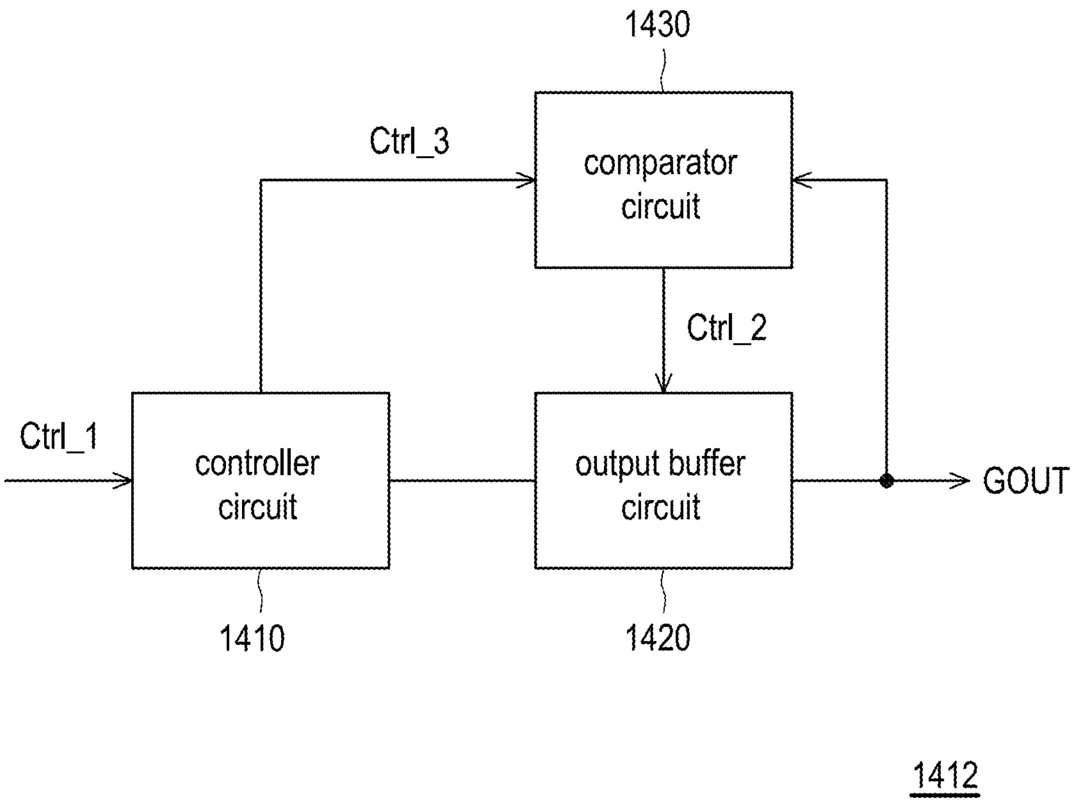
FIG. 14 is a block diagram illustrating a gate driver circuit according to another embodiment of the invention.

FIG. 14 is a block diagram illustrating a gate driver circuit according to another embodiment of the invention. Referring to FIG. 14, the gate driver circuit 1412 includes a controller circuit 1410, an output buffer circuit 1420, and a comparator circuit 1430. The comparator circuit 1430 is coupled to the controller circuit 1410 and the output buffer circuit 1420. The comparator circuit 1430 is configured to detect the voltage value of the driving signal GOUT, and control the conduction states of the current transmission paths of the output buffer circuit 1420 according to the voltage value of the driving signal GOUT.

To be specific, the comparator circuit 1430 may compare the driving signal GOUT with the operating voltages VRGH, VRGH2, VRGL and/or VRGL2, and determine whether to turn off corresponding current transmission paths of the output buffer circuit 1420 according to the comparison result. For example, the comparator circuit 1430 may compare the driving signal GOUT with the operating voltages VRGH and VRGH2. When the driving signal GOUT is larger than or equal to the operating voltage VRGH, i.e. GOUT≥VRGH, the comparator circuit 1430 turns off the current transmission path corresponding to the operating voltage VRGH. When the driving signal GOUT is larger than or equal to the operating voltage VRGH2, i.e. GOUT≥VRGH2, the comparator circuit 1430 turns off the current transmission path corresponding to the operating voltage VRGH2.

Similarly, the comparator circuit 1430 may also compare the driving signal GOUT with the operating voltages VRGL and VRGL2. When the driving signal GOUT is smaller than or equal to the operating voltage VRGL, i.e. GOUT 5 VRGL, the comparator circuit 1430 turns off the current transmission path corresponding to the operating voltage VRGL. When the driving signal GOUT is smaller than or equal to the operating voltage VRGL2, i.e. GOUT 5 VRGL2, the comparator circuit 1430 turns off the current transmission path corresponding to the operating voltage VRGL2.

On the other hand, the controller circuit 1410 receives the first control signal Ctrl_1 and outputs a third control signal Ctrl_3 to the comparator circuit 1430 according to the first control signal Ctrl_1. The comparator circuit 1430 receives the third control signal Ctrl_3 from the controller circuit 1410, and outputs the second control signal Ctrl_2 to the output buffer circuit 1420 according to the third control signal Ctrl_3, wherein the second control signal Ctrl_2 includes signals EN_VH, EN_VH2, EN_VL and EN_VL2. The comparator circuit 1430 is configured to control the conduction states of the current transmission paths of the output buffer circuit 1420 by the second control signal Ctrl_2, to enhancing the driving capability of the output buffer circuit 1420.

Figure 15:
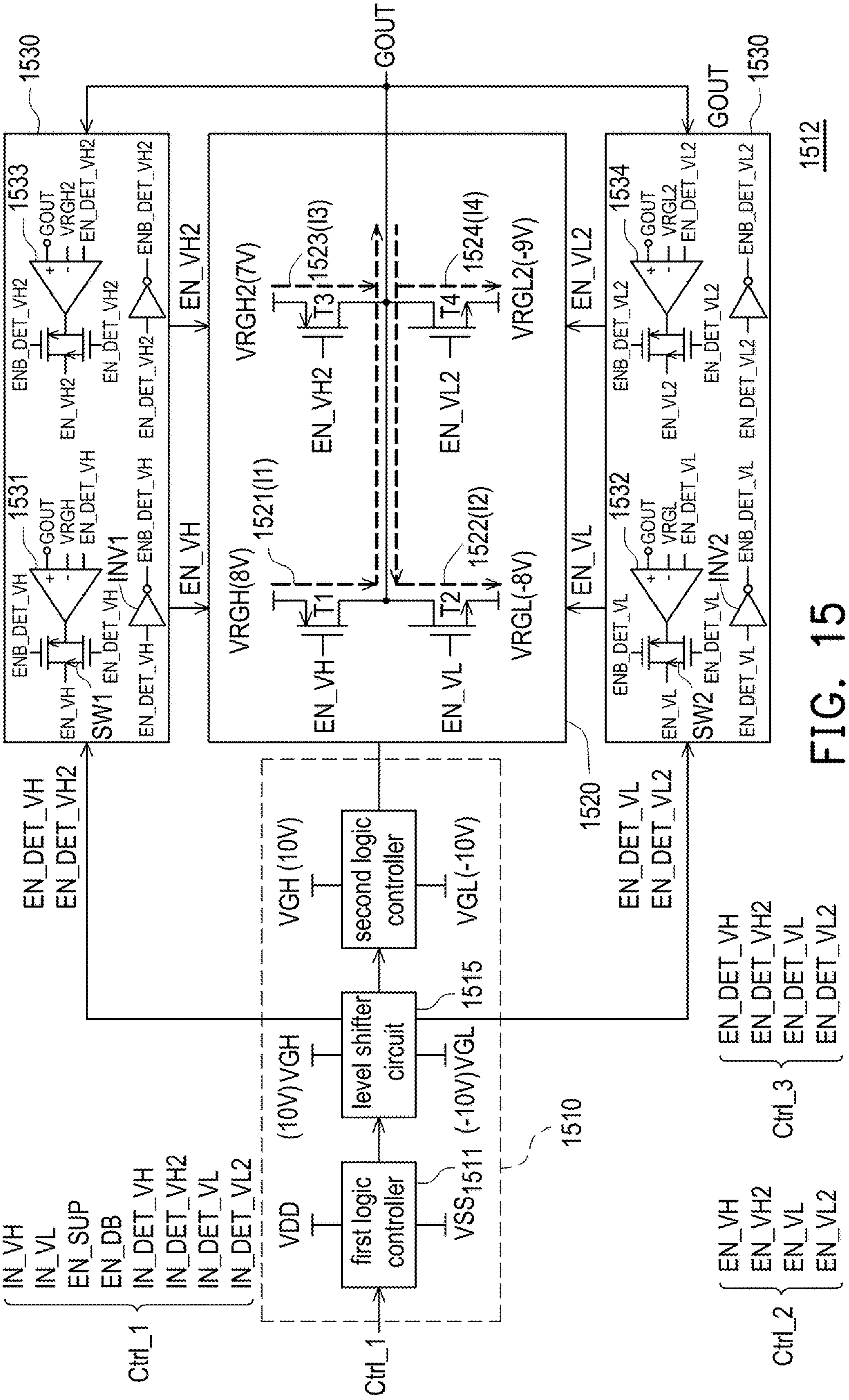
FIG. 15 is a schematic diagram illustrating a gate driver circuit according to another embodiment of the invention.

FIG. 15 is a schematic diagram illustrating a gate driver circuit according to another embodiment of the invention. Referring to FIG. 15, the first control signal Ctrl_1 further includes signals IN_DET_VH, IN_DET_VH2, IN_DET_VL, and IN_DET_VL2. The level shifter circuit 1515 further receives the signals IN_DET_VH, IN_DET_VH2, IN_DET_VL, and IN_DET_VL2 of low level from the first logic controller 1511. The level shifter circuit 1515 shifts the signals IN_DET_VH, IN_DET_VH2, IN_DET_VL, and IN_DET_VL2 of low level to signals EN_DET_VH, EN_DET_VH2, EN_DET_VL, and EN_DET_VL2 of high level, wherein a third control signal Ctrl_3 includes the signals EN_DET_VH, EN_DET_VH2, EN_DET_VL, and EN_DET_VL2. The level shifter circuit 1515 outputs the third control signal Ctrl_3 to the comparator circuit 1530.

The output buffer circuit 1520 is coupled to the first operating voltage VRGH, the second operating voltage VRGL2, the third operating voltage VRGH2, and the fourth operating voltage VRGL. The comparator circuit 1530 includes a first comparator 1531, a second comparator 1532, a third comparator 1533, and a fourth comparator 1534. Taking the first comparator 1531 for example, the first comparator 1531 is controlled by the signal EN_DET_VH and configured to compare the driving signal GOUT with the first operating voltage VRGH. When the driving signal GOUT is larger than or equal to the first operating voltage VRGH, the comparator circuit 1530 outputs the signal EN_VH to turn off the first transistor T1, such that the current transmission path 1521 corresponding to the first operating voltage VRGH is also turned off. In addition, the first comparator 1531 is coupled to a switch element SW1. The switch element SW1 is controlled by the signals EN_DET_VH and ENB_DET_VH and configured to determine whether to output the signal EN_VH. The signal ENB_DET_VH is an inverse signal of the signal EN_DET_VH and inverted by an inverter INV1. The operation of the third comparator 1533 is similar to that of the first comparator 1531 and can be deduced by analogy.

In the present embodiment, the first operating voltage VRGH is larger than the third operating voltage VRGH2, and the first operating voltage VRGH and the third operating voltage VRGH2 are set as 8V and 7V, respectively. When the driving signal GOUT is smaller than 7V, i.e. GOUT<7V, the current transmission paths 1521 and 1523 are conducted, similar to the third phase illustrated in FIG. 11C. When the driving signal GOUT is larger than or equal to 7V, i.e. GOUT≥7V, only the current transmission path 1521 is conducted, while the current transmission path 1523 is not conducted. This is similar to the fourth phase illustrated in FIG. 11D. When the driving signal GOUT is larger than or equal to 8V, i.e. GOUT≥8V, the current transmission paths 1521 and 1523 are not conducted.

Taking the second comparator 1532 for another example, the second comparator 1532 is controlled by the signal EN_DET_VL and configured to compare the driving signal GOUT with the fourth operating voltage VRGL. When the driving signal GOUT is smaller than or equal to the fourth operating voltage VRGL, the comparator circuit 1530 outputs the signal EN_VL to turn off the second transistor T2, such that the current transmission path 1522 corresponding to the fourth operating voltage VRGL is also turned off. In addition, the second comparator 1532 is coupled to a switch element SW2. The switch element SW2 is controlled by the signals EN_DET_VL and ENB_DET_VL and configured to determine whether to output the signal EN_VL. The signal ENB_DET_VL is an inverse signal of the signal EN_DET_VL and inverted by an inverter INV2. The operation of the fourth comparator 1534 is similar to that of the second comparator 1532 and can be deduced by analogy.

In the present embodiment, the fourth operating voltage VRGL is larger than the second operating voltage VRGL2, and the fourth operating voltage VRGL and the second operating voltage VRGL2 are set as −8V and −9V, respectively. When the driving signal GOUT is larger than −8V, i.e. GOUT>−8V, the current transmission paths 1522 and 1524 are conducted, similar to the first phase illustrated in FIG. 11A. When the driving signal GOUT is smaller than or equal to −8V, i.e. GOUT≤−8V, only the current transmission path 1524 is conducted, while the current transmission path 1522 is not conducted. This is similar to the second phase illustrated in FIG. 11B. When the driving signal GOUT is smaller than or equal to −9V, i.e. GOUT≤−9V, the current transmission paths 1522 and 1524 are not conducted.

Figure 16:
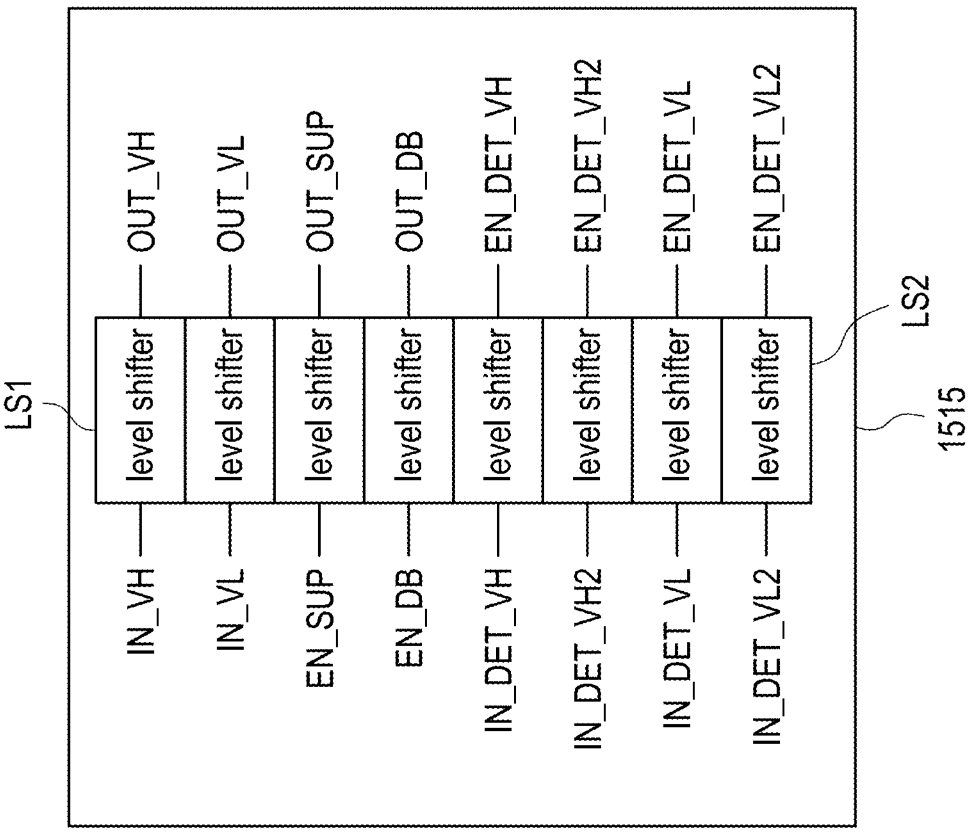
FIG. 16 illustrates a circuit structure of the level shifter circuit of FIG. 15 according to an embodiment of the invention.

FIG. 16 illustrates a circuit structure of the level shifter circuit of FIG. 15 according to an embodiment of the invention. Referring to FIG. 16, the level shifter circuit 1515 further includes a plurality of level shifters LS2 respectively configured to shift the signals IN_DET_VH, IN_DET_VH2, IN_DET_VL, and IN_DET_VL2 of low level to the signals EN_DET_VH, EN_DET_VH2, EN_DET_VL, and EN_DET_VL2 of high level.

Figure 17:
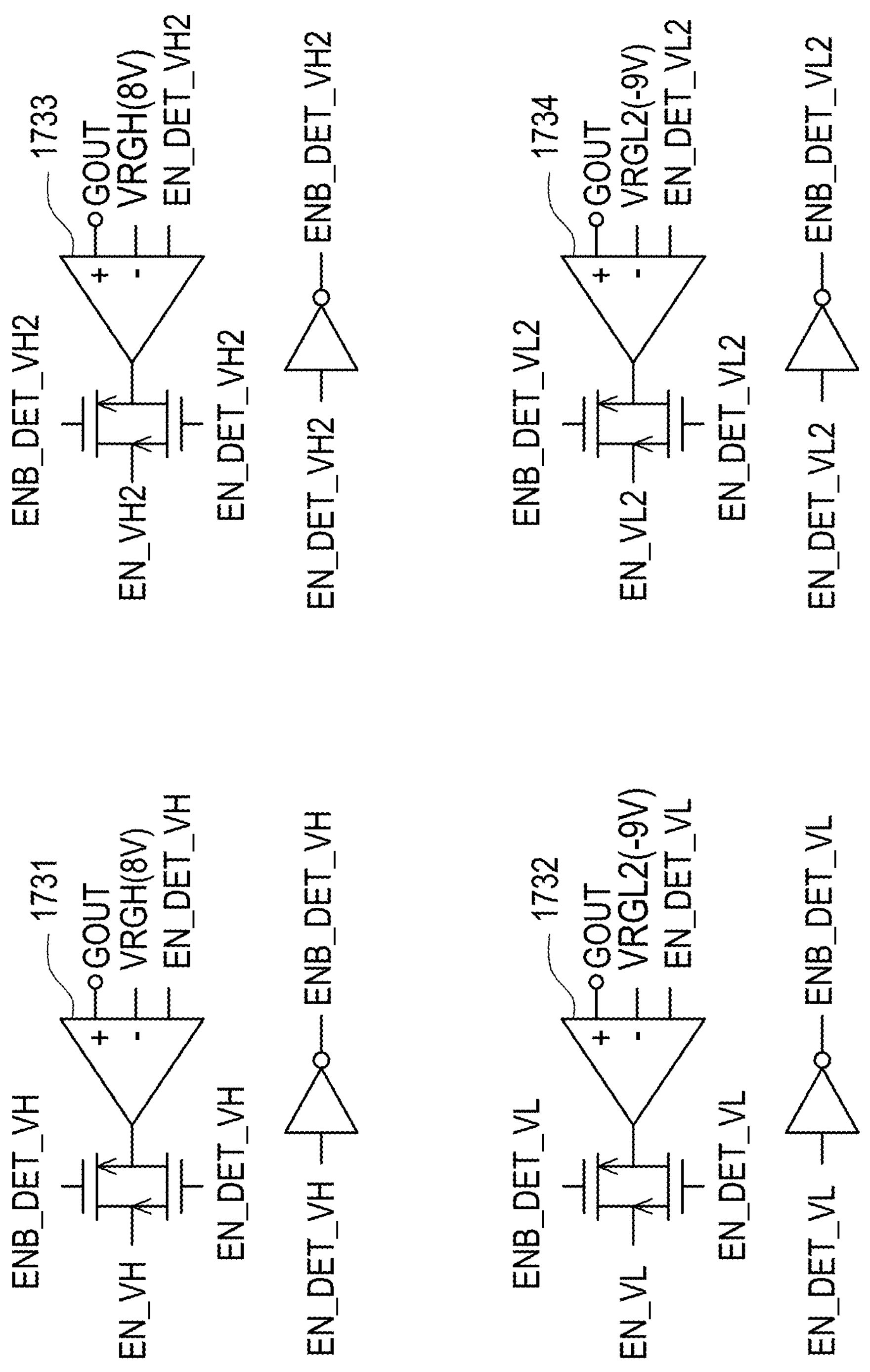
FIG. 17 is a circuit diagram illustrating a comparator circuit according to an embodiment of the invention.
Figure 18A:
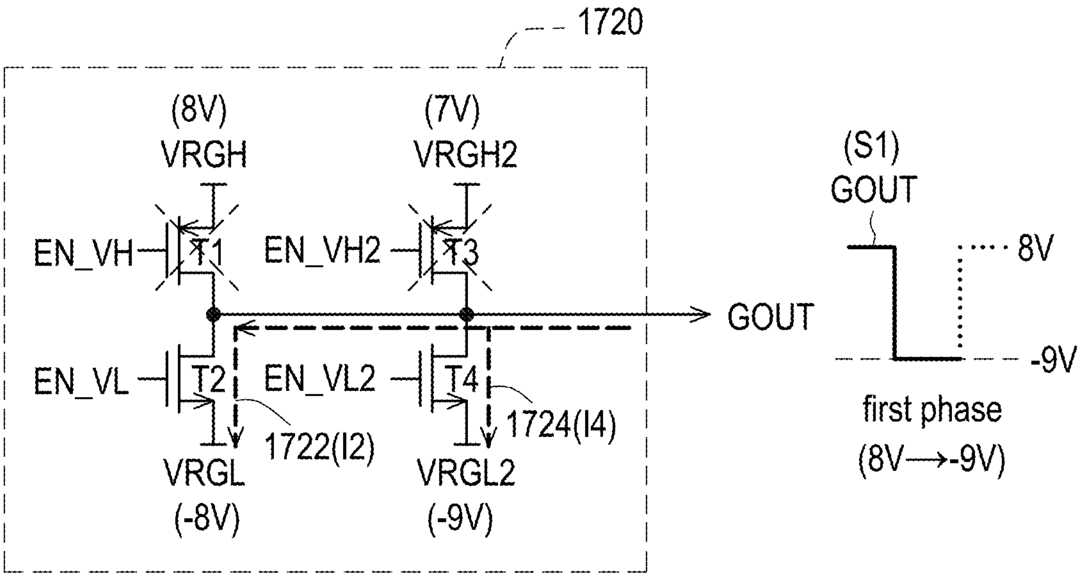
FIG. 18A and FIG. 18B illustrate an output buffer circuit and a driving signal according to an embodiment of the invention.
Figure 18B:
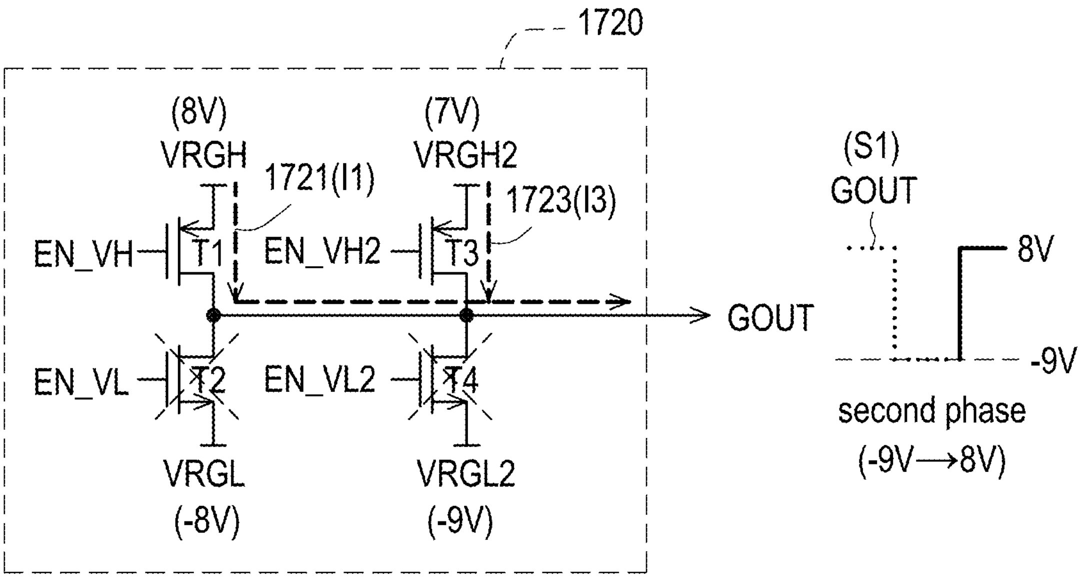

FIG. 17 is a circuit diagram illustrating a comparator circuit according to an embodiment of the invention. FIG. 18A and FIG. 18B illustrate an output buffer circuit and a driving signal according to an embodiment of the invention. Referring to FIG. 17 to FIG. 18B, the comparator circuit 1730 includes a first comparator 1731, a second comparator 1732, a third comparator 1733, and a fourth comparator 1734. The comparator circuit 1730 of FIG. 17 is similar to the comparator circuit 1530 of FIG. 15, and the main difference therebetween, for example, lies in that the third comparator 1733 is configured to receive the first operating voltage VRGH and compare the driving signal GOUT with the first operating voltage VRGH, and the second comparator 1732 is configured to receive the second operating voltage VRGL2 and compare the driving signal GOUT with the second operating voltage VRGL2.

To be specific, the driving signal GOUT is generated in two phases. FIG. 18A shows the driving signal GOUT changes from 8V to −9V and is maintained at −9V for the time Tc1 in the first phase. FIG. 18B shows the driving signal GOUT changes from −9V to 8V and is maintained at 8V in the second phase.

In the first phase, when the driving signal GOUT is larger than −9V, i.e. GOUT>−9V, the current transmission paths 1722 and 1724 are both conducted, such that the driving signal GOUT can quickly change from 8V to −9V and be maintained at −9V for the time Tc1. In the second phase, when the driving signal GOUT is smaller than 8V, i.e. GOUT<8V, the current transmission paths 1721 and 1723 are both conducted, such that the driving signal GOUT can quickly change from −9V to 8V and be maintained at 8V.

Figure 19:
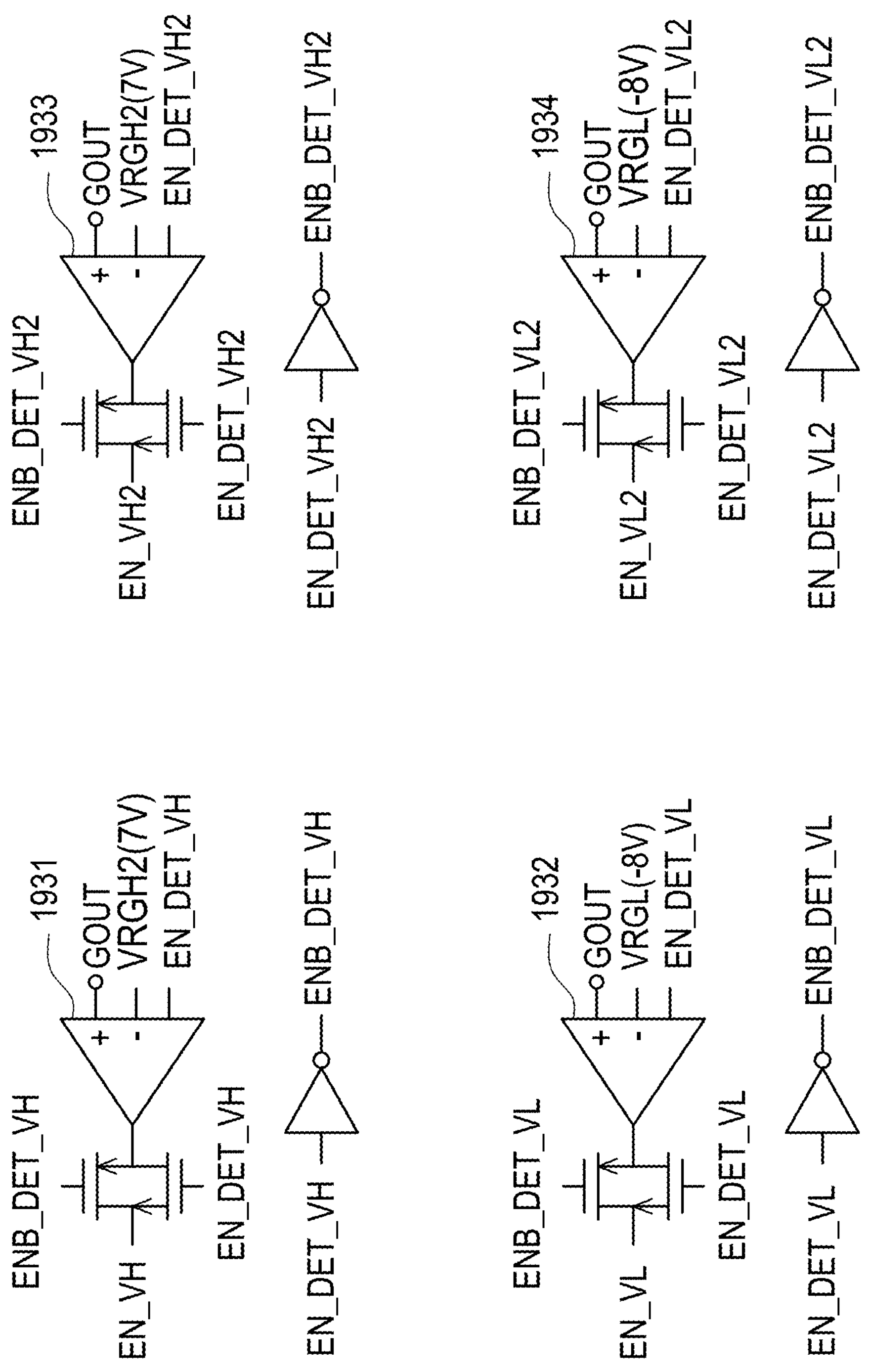
FIG. 19 is a circuit diagram illustrating a comparator circuit according to an embodiment of the invention.

FIG. 19 is a circuit diagram illustrating a comparator circuit according to an embodiment of the invention. Referring to FIG. 19, the comparator circuit 1930 includes a first comparator 1931, a second comparator 1932, a third comparator 1933, and a fourth comparator 1934. The comparator circuit 1930 of FIG. 19 is similar to the comparator circuit 1530 of FIG. 15, and the main difference therebetween, for example, lies in that the first comparator 1931 is configured to receive the third operating voltage VRGH2 and compare the driving signal GOUT with the third operating voltage VRGH2, and the fourth comparator 1934 is configured to receive the fourth operating voltage VRGL and compare the driving signal GOUT with the fourth operating voltage VRGL.

Since the first comparator 1931 and the third comparator 1933 both compare the driving signal GOUT with the third operating voltage VRGH2, when the driving signal GOUT is larger than or equal to 7V, i.e. GOUT≥7V, the corresponding current transmission paths, e.g. 1721 and 1723 are not conducted. As a result, the driving signal GOUT may have a maximum level of 7V.

On the other hand, since the second comparator 1932 and the fourth comparator 1934 both compare the driving signal GOUT with the fourth operating voltage VRGL, when the driving signal GOUT is smaller than or equal to −8V, i.e. GOUT≤−8V, the corresponding current transmission paths, e.g. 1722 and 1724 are not conducted. As a result, the driving signal GOUT may have a minimum level of −8V.

Figure 20:
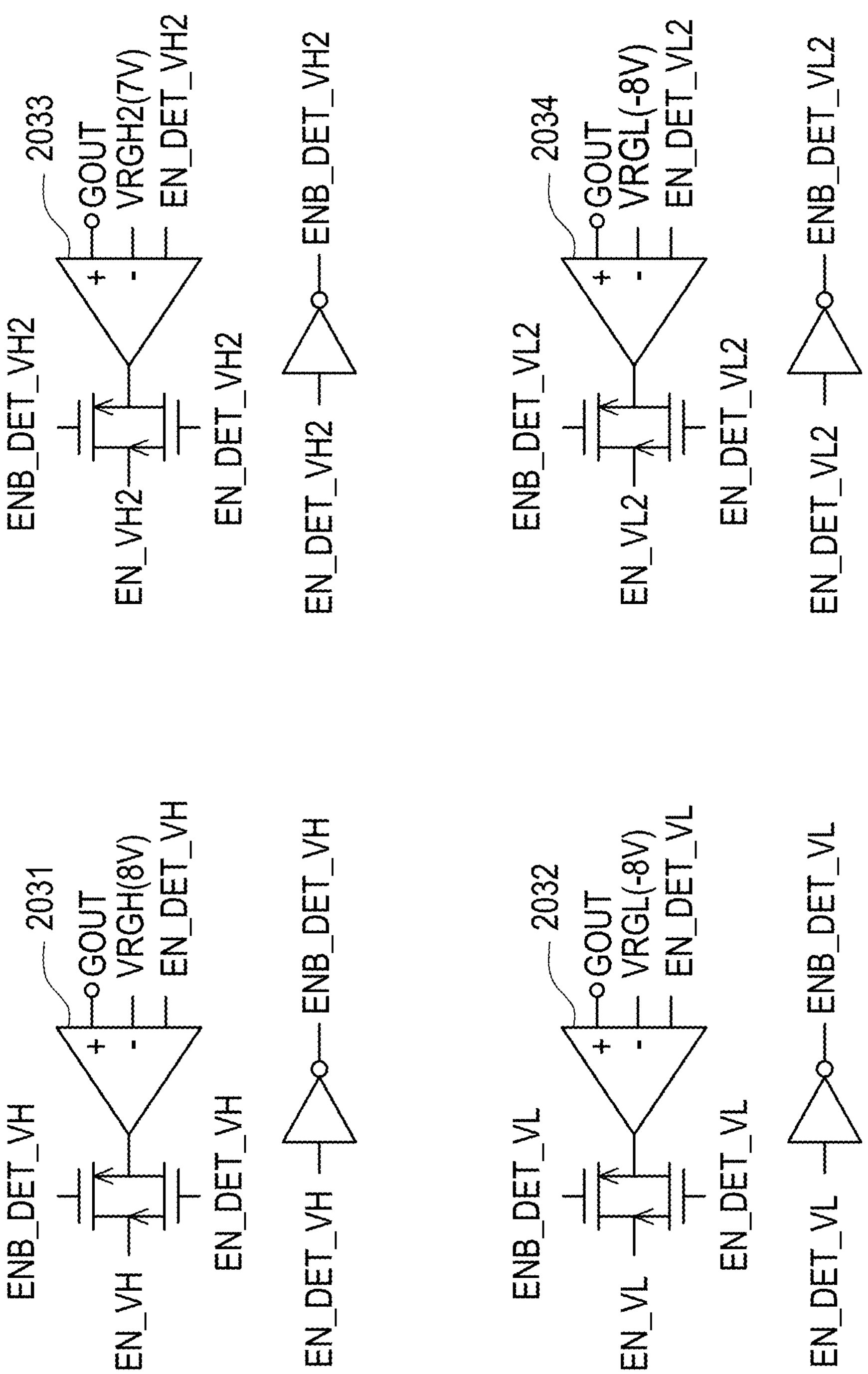
FIG. 20 is a circuit diagram illustrating a comparator circuit according to another embodiment of the invention.

FIG. 20 is a circuit diagram illustrating a comparator circuit according to another embodiment of the invention. Referring to FIG. 20, the comparator circuit 2030 includes a first comparator 2031, a second comparator 2032, a third comparator 2033, and a fourth comparator 2034. The comparator circuit 2030 of FIG. 20 is similar to the comparator circuit 1530 of FIG. 15, and the main difference therebetween, for example, lies in that the fourth comparator 2034 is configured to receive the fourth operating voltage VRGL and compare the driving signal GOUT with the fourth operating voltage VRGL.

Since the second comparator 2032 and the fourth comparator 2034 both compare the driving signal GOUT with the fourth operating voltage VRGL, when the driving signal GOUT is smaller than or equal to −8V, i.e. GOUT≤−8V, the corresponding current transmission paths, e.g. 1722 and 1724 are not conducted. As a result, the driving signal GOUT may have a minimum level of −8V.

Figure 21:
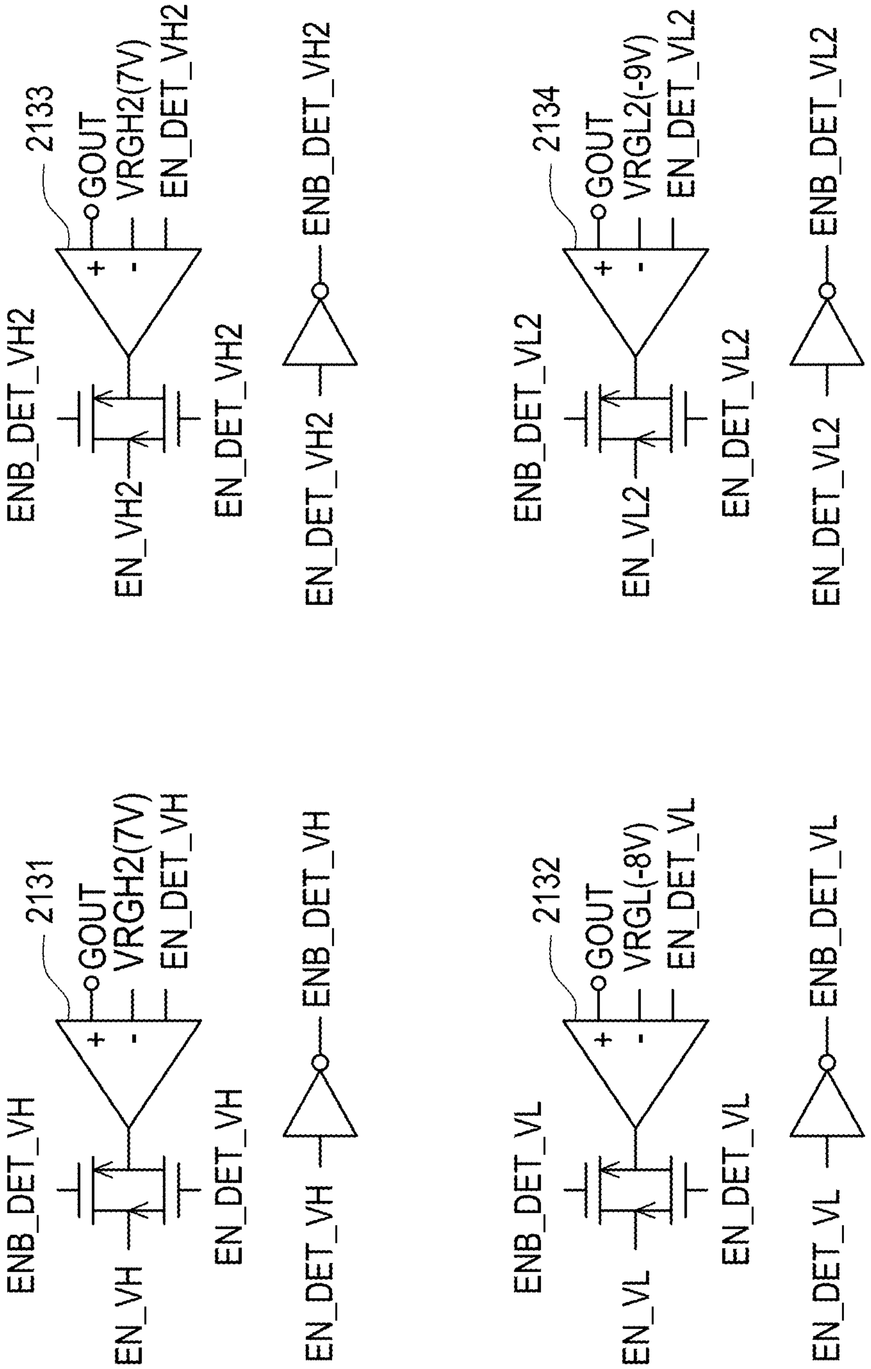
FIG. 21 is a circuit diagram illustrating a comparator circuit according to another embodiment of the invention.

FIG. 21 is a circuit diagram illustrating a comparator circuit according to another embodiment of the invention. Referring to FIG. 21, the comparator circuit 2130 includes a first comparator 2131, a second comparator 2132, a third comparator 2133, and a fourth comparator 2134. The comparator circuit 2130 of FIG. 21 is similar to the comparator circuit 1530 of FIG. 15, and the main difference therebetween, for example, lies in that the first comparator 2131 is configured to receive the third operating voltage VRGH2 and compare the driving signal GOUT with the third operating voltage VRGH2.

Since the first comparator 2131 and the third comparator 2133 both compare the driving signal GOUT with the third operating voltage VRGH2, when the driving signal GOUT is larger than or equal to 7V, i.e. GOUT≥7V, the corresponding current transmission paths, e.g. 1721 and 1723 are not conducted. As a result, the driving signal GOUT may have a maximum level of 7V.

Figure 22:
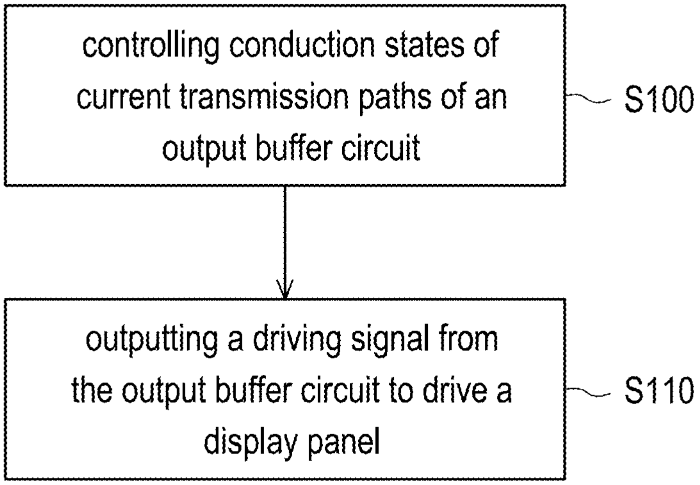
FIG. 22 is a flowchart illustrating a method for driving a display panel according to an embodiment of the invention.

FIG. 22 is a flowchart illustrating a method for driving a display panel according to an embodiment of the invention. Referring to FIG. 1, FIG. 7 and FIG. 22, the method for driving the display panel is at least adapted to the electronic device 100 of FIG. 1 and the gate driver circuit 712 of FIG. 7, but the invention is not limited thereto.

Taking the electronic device 100 of FIG. 1 and the gate driver circuit 712 of FIG. 7 for example, in step S100, the controller circuit 710 controls conduction states of current transmission paths of the output buffer circuit 720. The driving capability of the output buffer circuit 720 is determined according to the number of the current transmission paths that are conducted. In the present embodiment, at least two of the current transmission paths are conducted at the same time in a specified phase. Next, in step S110, the output buffer circuit 720 outputs a driving signal GOUT to drive the display panel 120.

The method for driving the display panel described in the embodiment of the invention is sufficiently taught, suggested, and embodied in the embodiments illustrated in FIG. 1 to FIG. 21, and therefore no further description is provided herein.

In summary, in the embodiments of the invention, the controller circuit can control the conduction states of the current transmission paths of the output buffer circuit, and the driving capability of the output buffer circuit is determined according to the number of the current transmission paths that are conducted. In some phases, at least two of the current transmission paths are conducted at the same time. Therefore, the time for writing data to the pixels can be increased by enhancing the driving capability of the gate driver circuit.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A gate driver circuit, configured to drive a display panel, the gate driver circuit comprising:

an output buffer circuit, comprising a plurality of current transmission paths, and configured to output a driving signal to drive the display panel;

a controller circuit, coupled to the output buffer circuit, and configured to control conduction states of the current transmission paths of the output buffer circuit; and a comparator circuit, configured to detect a voltage value of the driving signal, and configured to control the conduction states of the current transmission paths of the output buffer circuit according to the voltage value of the driving signal.

2. The gate driver circuit of claim 1, wherein a driving capability of the output buffer circuit is determined according to a number of the current transmission paths that are conducted.

3. The gate driver circuit of claim 1, wherein the controller circuit receives at least one first control signal and outputs at least one second control signal to the output buffer circuit according to the at least one first control signal, and the controller circuit controls the conduction states of the current transmission paths of the output buffer circuit by the at least one second control signal.

4. The gate driver circuit of claim 1, wherein at least two of the current transmission paths are conducted at a same time in a specified phase.

5. The gate driver circuit of claim 4, wherein the at least two current transmission paths are coupled to different operating voltages.

6. The gate driver circuit of claim 4, wherein the at least two current transmission paths are partially overlapped.

7. The gate driver circuit of claim 1, wherein the output buffer circuit is coupled to a first operating voltage and a second operating voltage, the second operating voltage is smaller than the first operating voltage, and the driving signal has a high level equal to the first operating voltage and a low level equal to the second operating voltage.

8. The gate driver circuit of claim 1, wherein the comparator circuit is coupled to the controller circuit and the output buffer circuit.

9. The gate driver circuit of claim 8, wherein the controller circuit receives at least one first control signal and outputs at least one third control signal to the comparator circuit according to the at least one first control signal, wherein the comparator circuit receives the at least one third control signal from the controller circuit and outputs at least one second control signal to the output buffer circuit according to the at least one third control signal, and the comparator circuit controls the conduction states of the current transmission paths of the output buffer circuit by the at least one second control signal.

10. The gate driver circuit of claim 8, wherein the output buffer circuit is coupled to a first operating voltage, a second operating voltage, a third operating voltage, and a fourth operating voltage, and the first operating voltage is larger than the third operating voltage, the third operating voltage is larger than the fourth operating voltage, and the fourth operating voltage is larger than the second operating voltage.

11. The gate driver circuit of claim 10, wherein the comparator circuit compares the driving signal with the first operating voltage and the second operating voltage, when the driving signal is smaller than the first operating voltage, the current transmission paths corresponding to the first operating voltage and the third operating voltage are conducted; and when the driving signal is larger than the second operating voltage, the current transmission paths corresponding to the second operating voltage and the fourth operating voltage are conducted.

12. The gate driver circuit of claim 10, wherein the comparator circuit compares the driving signal with the third operating voltage and the fourth operating voltage, when the driving signal is larger than or equal to the third operating voltage, the current transmission paths corresponding to the first operating voltage and the third operating voltage are not conducted; and when the driving signal is smaller than or equal to the fourth operating voltage, the current transmission paths corresponding to the second operating voltage and the fourth operating voltage are not conducted.

13. The gate driver circuit of claim 10, wherein the comparator circuit compares the driving signal with the first operating voltage, the third operating voltage, and the fourth operating voltage, when the driving signal is smaller than or equal to the fourth operating voltage, the current transmission paths corresponding to the second operating voltage and the fourth operating voltage are not conducted.

14. The gate driver circuit of claim 10, wherein the comparator circuit compares the driving signal with the second operating voltage, the third operating voltage, and the fourth operating voltage, when the driving signal is larger than or equal to the second operating voltage, the current transmission paths corresponding to the first operating voltage and the third operating voltage are not conducted.

15. A method for driving a display panel, adapted to a display device, wherein the display device comprises a gate driver circuit and the display panel, and the gate driver circuit comprises an output buffer circuit, the method comprising:

controlling conduction states of current transmission paths of the output buffer circuit, wherein a driving capability of the output buffer circuit is determined according to a number of the current transmission paths that are conducted, and at least two of the current transmission paths are conducted at a same time in a specified phase; outputting a driving signal from the output buffer circuit to drive the display panel; and detecting a voltage value of the driving signal, wherein in the step of controlling the conduction states of the current transmission paths of the output buffer circuit, the conduction states of the current transmission paths of the output buffer circuit are controlled according to the voltage value of the driving signal.

16. The method for driving the display panel of claim 15, further comprising:

receiving at least one first control signal and outputting at least one second control signal to the output buffer circuit according to the at least one first control signal, wherein in the step of controlling the conduction states of the current transmission paths of the output buffer circuit, the conduction states of the current transmission paths of the output buffer circuit are controlled by the at least one second control signal.

17. The method for driving the display panel of claim 15, further comprising:

coupling the output buffer circuit to a first operating voltage and a second operating voltage, wherein the second operating voltage is smaller than the first operating voltage, and the driving signal has a high level equal to the first operating voltage and a low level equal to the second operating voltage.

18. The method for driving the display panel of claim 15, further comprising:

receiving at least one first control signal and outputting at least one third control signal according to the at least one first control signal; and receiving the at least one third control signal and outputting at least one second control signal to the output buffer circuit according to the at least one third control signal, wherein in the step of controlling the conduction states of the current transmission paths of the output buffer circuit, the conduction states of the current transmission paths of the output buffer circuit are controlled by the at least one second control signal.

19. The method for driving the display panel of claim 15, further comprising:

coupling to a first operating voltage, a second operating voltage, a third operating voltage, and a fourth operating voltage, wherein the first operating voltage is larger than the third operating voltage, the third operating voltage is larger than the fourth operating voltage, and the fourth operating voltage is larger than the second operating voltage.

20. The method for driving the display panel of claim 19, wherein the step of detecting the voltage value of the driving signal comprises:

comparing the driving signal with the first operating voltage and the second operating voltage, wherein when the driving signal is smaller than the first operating voltage, the current transmission paths corresponding to the first operating voltage and the third operating voltage are conducted; and when the driving signal is larger than the second operating voltage, the current transmission paths corresponding to the second operating voltage and the fourth operating voltage are conducted.

21. The method for driving the display panel of claim 19, wherein the step of detecting the voltage value of the driving signal comprises:

comparing the driving signal with the third operating voltage and the fourth operating voltage, wherein when the driving signal is larger than or equal to the third operating voltage, the current transmission paths corresponding to the first operating voltage and the third operating voltage are not conducted; and when the driving signal is smaller than or equal to the fourth operating voltage, the current transmission paths corresponding to the second operating voltage and the fourth operating voltage are not conducted.

22. The method for driving the display panel of claim 19, wherein the step of detecting the voltage value of the driving signal comprises:

comparing the driving signal with the first operating voltage, the third operating voltage, and the fourth operating voltage, wherein when the driving signal is smaller than or equal to the fourth operating voltage, the current transmission paths corresponding to the second operating voltage and the fourth operating voltage are not conducted.

23. The method for driving the display panel of claim 19, wherein the step of detecting the voltage value of the driving signal comprises:

comparing the driving signal with the second operating voltage, the third operating voltage, and the fourth operating voltage, wherein when the driving signal is larger than or equal to the second operating voltage, the current transmission paths corresponding to the first operating voltage and the third operating voltage are not conducted.

24. The method for driving the display panel of claim 15, wherein the at least two current transmission paths are coupled to different operating voltages.

25. The method for driving the display panel of claim 15, wherein the at least two current transmission paths are partially overlapped.

* * * * *